(12) United States Patent
Frenklakh et al.

(10) Patent No.: US 12,238,073 B2
(45) Date of Patent: Feb. 25, 2025

(54) METHOD FOR FRAUD PREVENTION AND TRACKING A COMMUNICATION PATH WITH SMART CONTRACTS

(71) Applicant: RNDK Security & Systems LTD, Petah Tikva (IL)

(72) Inventors: Arie Frenklakh, Herzliya (IL); Leonid Rubanov, Petah Tikva (IL); Boris Rakhlin, Haifa (IL)

(73) Assignee: RNKD Security & Systems Ltd, Petah Tikva (IL)

( * ) Notice: Subject to any disclaimer, the term of this patent is extended or adjusted under 35 U.S.C. 154(b) by 137 days.

(21) Appl. No.: 17/638,793

(22) PCT Filed: Aug. 27, 2020

(86) PCT No.: PCT/IL2020/050936
§ 371 (c)(1),
(2) Date: Feb. 25, 2022

(87) PCT Pub. No.: WO2021/038568
PCT Pub. Date: Mar. 4, 2021

(65) Prior Publication Data
US 2022/0294768 A1   Sep. 15, 2022

Related U.S. Application Data

(60) Provisional application No. 63/070,327, filed on Aug. 26, 2020, provisional application No. 62/892,601, filed on Aug. 28, 2019.

(51) Int. Cl.
*H04L 9/40*      (2022.01)
*G06F 21/64*    (2013.01)
*H04L 9/32*      (2006.01)

(52) U.S. Cl.
CPC .......... *H04L 63/0421* (2013.01); *G06F 21/64* (2013.01); *H04L 9/3213* (2013.01); *H04L 63/0428* (2013.01)

(58) Field of Classification Search
None
See application file for complete search history.

(56) References Cited

U.S. PATENT DOCUMENTS

| | | | |
|---|---|---|---|
| 2013/0084896 A1* | 4/2013 | Barkie | H04W 12/033 455/466 |
| 2018/0075527 A1 | 3/2018 | Nagla et al. | |

(Continued)

OTHER PUBLICATIONS

V. Sharma, I. You, F. Palmieri, D. N. K. Jayakody and J. Li, "Secure and Energy-Efficient Handover in Fog Networks Using Blockchain-Based DMM," in IEEE Communications Magazine, vol. 56, No. 5, pp. 22-31, May 2018, doi: 10.1109/MCOM.2018.1700863 (Year: 2018).*

(Continued)

*Primary Examiner* — Benjamin E Lanier
*Assistant Examiner* — Felicia Farrow
(74) *Attorney, Agent, or Firm* — Knobbe, Martens, Olson & Bears, LLP

(57) ABSTRACT

A method for tracking communication, comprising: receiving a notification pertaining to a communication protocol and associated with a communication between an initiating device and a receiving device; implementing a security protocol embedded within the communication protocol by: establishing, on a distributed ledger, a smart contract for tracking communication along a channel to a subsequent operator of a sequence of operators forming a communication path between the initiating and receiving device, the channel being at least a segment of the communication path, and registering the smart contract with a governing contract associated with an originating operator in communication (Continued)

with the initiating device over a local channel and configured to govern communication along the communication path; and transferring the notification to the subsequent operator along the at least segment of the communication path.

50 Claims, 18 Drawing Sheets

(56) References Cited

U.S. PATENT DOCUMENTS

| | | |
|---|---|---|
| 2018/0285840 A1 | 10/2018 | Hasan |
| 2019/0097807 A1 | 3/2019 | Mahanta et al. |
| 2019/0199693 A1 | 6/2019 | Vityaz |
| 2019/0392164 A1* | 12/2019 | Dutta .................... H04L 9/0825 |
| 2020/0007581 A1* | 1/2020 | Vouk ....................... H04L 63/20 |

OTHER PUBLICATIONS

International Search Report and Written Opinion for PCT Application No. PCT/IL20/50936, dated Feb. 10, 2021, in 7 pages.

\* cited by examiner

METHOD FOR FRAUD PREVENTION AND TRACKING A COMMUNICATION PATH WITH SMART CONTRACTS

CROSS-REFERENCE TO RELATED APPLICATIONS

This application claims the benefit of priority of U.S. Provisional Patent Application No. 62/892,601, filed Aug. 28, 2019, entitled "Method For Tracking a Communication path with Smart Contracts", and U.S. Provisional Patent Application No. 63/070,327, filed Aug. 26, 2020, entitled "Method For Fraud Prevention and Tracking a Communication Path with Smart Contracts", the contents of which are incorporated herein by reference in their entirety.

FIELD OF THE DISCLOSED TECHNIQUE

The disclosed technique relates to network communications, in general, and to methods and systems for tracking a communication path over a network using smart contracts, in particular.

BACKGROUND OF THE DISCLOSED TECHNIQUE

Subscriber Identity Module box (SIMbox) fraud, or more generally, voice traffic termination fraud is a growing problem faced by the mobile network industry, costing mobile network operators tens of billions of dollars every year. By using pre-paid SIM cards to reroute long distance calls to appear as though they originated locally, the fraudsters bypass international calling rates and evade paying local taxes. They also violate quality of service guidelines, and prevent government and defense agencies from monitoring calling traffic, opening the door for criminal and terrorist activity.

Reference is now made to FIG. 1 which illustrates a calling network diverted by a SIMbox, in accordance with the prior art. A mobile network 10 shows a legitimate calling route between a calling device 12 and a receiving device 20, and a fraudulent route bypassing the legitimate route. Calling device 12 subscribes to an originating operator operating an originating communication network 14. Receiving device 20 subscribes to a terminating operator operating a receiving communication network 18. Initiating device 12 transmits to originating communication network 14, a request to connect to receiving device 20. Receiving device 20 is recognized by originating communication network 14 as a subscriber of the terminating operator operating receiving communication network 18. The originating operator routes the call from originating communication network 14 to an international traffic carrier 16, which forwards the call to receiving communication network 18 (solid arrow). Receiving communication network 18 connects the call to receiving device 20 as an international call (solid arrow). The terminating operator receives a surcharge for placing an international call, and pays a tax to the local government.

Alternatively, a fraudster operating a SIMbox in the location of receiving device 20 arbitrates an agreement with international traffic carrier 16. Instead forwarding the international call to receiving communication network 18, the call is forwarded to SIMbox 22 (dashed arrow), which stores multiple local, prepaid SIM cards. SIMbox 22 forwards the call to receiving device 20 as a local call (dashed arrow). The terminating operator earns no fee for placing the call, since it appears as a local call, and no tax is payed to the government. The fraudster and international traffic carrier 16 split the fee that would have been earned by the terminating operator as well as any unpaid tax as profit. Essentially, the fraudsters operate as an arbitrageur, profiting from the difference between the international and local calling rates.

U.S. Pat. No. 10,067,810,B2 to Sarcouf et al, entitled "Performing Transactions Between Application Containers", directs to replacing a central clearinghouse with a distributed ledger for validating and authenticating transactions between application containers. Validation is secured using an encryption key management module.

U.S. Patent Application Publication 2013/0254052 A1 to Royyuru et al, entitled "Systems and Methods for Facilitating Payments via a Peer-to-Peer Protocol", directs to facilitating payment transactions over a network between a consumer device and a merchant device using credential-based tokenized information associated with the transaction.

U.S. Patent Application Publication 2017/078493 A1 to Melika et al, entitled "Cryptographically Managing Telecommunications Settlement", directs to establishing a contract fund between multiple telecommunications services when a communication channel is created. The contract fund is recorded on a cryptographic ledger, and cryptocurrency payments are released from the fund during the course of the channel service. When the communication channel terminates, the cryptocurrency are payments settled with the telecommunications services, and the payments are recorded on the cryptographic ledger.

International Publication WO 2018/201009 A1 to Lafever et al, entitled "Systems and Methods for Enforcing Centralized Privacy Controls in De-Centralized Systems" directs to storing data pertaining to a data subject on a distributed blockchain ledger. The data are stored to maintain the privacy of the data subjects, while allowing authorized parties to access relevant aspects of the data, in compliance with regulatory schemes, such as the General Data Protection Regulation (GDPR).

Blockchain Telecom whitepaper published on Dec. 29, 2017, entitled "Global Telecom Ecosystem without Intermediaries: Smart Contracts Allow Direct Interaction between Mobile Operators, Subscribers and Service Providers" directs to providing roaming services through a platform that allows remote subscribers to swap SIM card profiles on a distributed blockchain ledger that supports smart contracts.

SUMMARY OF THE PRESENT DISCLOSED TECHNIQUE

It is an object of the disclosed technique to provide a novel method and system for tracking communication over a communication network. In accordance with the disclosed technique, there is thus provided a method for tracking communication, the method comprising: receiving a notification pertaining to a communication protocol, the notification associated with a communication between an initiating device and a receiving device; implementing a security protocol embedded within the communication protocol, the security protocol comprising: establishing, on a distributed ledger, a smart contract for tracking communication along a channel to a subsequent operator of a sequence of operators forming a communication path between the initiating device and the receiving device, wherein the channel is at least a segment of the communication path, and registering the smart contract with a governing contract associated with an originating operator of the sequence of operators, wherein the originating operator is in communication with the initiating device over a first local channel, and wherein the governing contract is implemented on the distributed ledger and is configured to govern communication along the communication path; and transferring the notification to the subsequent operator along the at least segment of the communication path.

There is provided, in accordance with another embodiment of the disclosed technique, a system for tracking communication, comprising: a first operator of a sequence of operators forming a communication path between an initiating device and a receiving device; a channel coupling the first operator with a subsequent operator of the sequence of operators, wherein the channel forms at least a segment of the communication path; and a distributed ledger configured to communicate with each operator of the sequence of operators via a network, wherein the first operator is configured to: receive a notification pertaining to a communication protocol, the notification associated with a communication between the initiating device and the receiving device, implement a security protocol embedded within the communication protocol, the security protocol comprising: establishing, on the distributed ledger, a smart contract for tracking communication along the channel to the subsequent operator, and registering the smart contract with a governing contract associated with an originating operator of the sequence of operators, wherein the originating operator is in communication with the initiating device over a first local channel, and wherein the governing contract is implemented on the distributed ledger and is configured to govern communication along the communication path, and transfer the notification to the subsequent operator along the at least segment of the communication path.

There is provided, in accordance with a further embodiment of the disclosed technique, a method for tracking communication on a distributed ledger, comprising: receiving a request to implement a security protocol embedded within a communication protocol, wherein the security protocol is configured to track communication pertaining to the communication protocol along a communication path formed from a sequence of operators connecting an initiating device with a receiving device, the sequence comprising at least a first operator and a subsequent operator communicating over a channel forming at least a segment of the communication path; and implementing the security protocol by: establishing a governing contract for governing communication along the communication path, the governing contract associated with an originating operator of the sequence of operators, wherein the originating operator is in communication with the initiating device over a first local channel, establishing a smart contract for tracking communication along the at least segment of the communication path, and registering the smart contract with the governing contract.

There is provided, in accordance with another embodiment of the disclosed technique, a system for tracking communication, the system comprising: a distributed ledger implemented over a network of multiple computers; and a network connecting the distributed ledger with each operator of a sequence of operators forming a communication path, the communication path configured to connect an initiating device with a receiving device via a communication protocol, and comprising at least a first operator and a subsequent operator communicating over a channel forming at least a segment of the communication path, wherein the distributed ledger is configured to: receive a request to implement a security protocol embedded within the communication protocol, wherein the security protocol is configured to track communication complying with the communication protocol along the communication path; and implement the security protocol by: establishing a governing contract for governing communication along the communication path, the governing contract associated with an originating operator of the sequence of operators, wherein the originating operator is in communication with the initiating device over a first local channel, establishing a smart contract for tracking communication along the at least segment of the communication path, and registering the smart contract with the governing contract.

In some embodiments, implementing the security protocol further comprises receiving a confirmation of the registering the smart contract with the governing contract, wherein the transferring the notification to the subsequent operator along the channel is conditional on receiving the confirmation.

In some embodiments, implementing the security protocol further comprises registering the smart contract with the governing contract according to a cryptographic protocol that ensures confidentiality and anonymity with respect to a third operator of the sequence of operators forming the communication path between the initiating device and the receiving device.

In some embodiments, implementing the security protocol further comprises establishing the governing contract on the distributed ledger.

In some embodiments, implementing the security protocol further comprises verifying a device selected from the group consisting of: the originating operator, a terminating operator of the sequence of operators in communication with the receiving device over a second local channel, the initiating device, and the receiving device.

In some embodiments, implementing the security protocol further comprises receiving a confirmation of a registration of a preceding smart contract tracking a preceding channel with the governing contract, wherein the notification is received via the preceding channel.

In some embodiments, the communication protocol is a call protocol for establishing a call between the initiating device and the receiving device, wherein implementing the security protocol tracks the call over the channel.

In some embodiments, the communication protocol is a messaging protocol, wherein implementing the security protocol tracks a transmission of the notification over the channel.

In some embodiments, the notification is a short message sent from the initiating device to the receiving device.

In some embodiments, the method further comprises encrypting the short message to produce an encrypted copy, storing the encrypted copy, and replacing the short message as the notification with a global unique identifier (GUID) pointing to the encrypted copy, wherein implementing the security protocol tracks a transmission of the GUID over the channel.

In some embodiments, the notification is a global unique identifier (GUID) pointing to an encrypted copy of a short message sent from the initiating device to the receiving device, the method further comprising retrieving the encrypted copy with the GUID, decrypting the encrypted copy to recover the short message, and delivering the short message to the receiving device.

In some embodiments, the method further comprises settling the smart contract.

In some embodiments, settling the smart contract comprises receiving a credit for at least a portion of a token allocated for the communication path by the governing contract according to a cryptographic protocol of the distributed ledger.

In some embodiments, implementing the security protocol further comprises sending a second confirmation of the registering the at least one smart contract with the governing contract to the subsequent operator.

In some embodiments, implementing the security protocol further comprises allocating at least a portion of a token for the communication path according to a cryptographic protocol of the distributed ledger.

In some embodiments, implementing the security protocol further comprises distributing the at least a portion of the token as a settlement for the at least one smart contract.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

Figure 1:
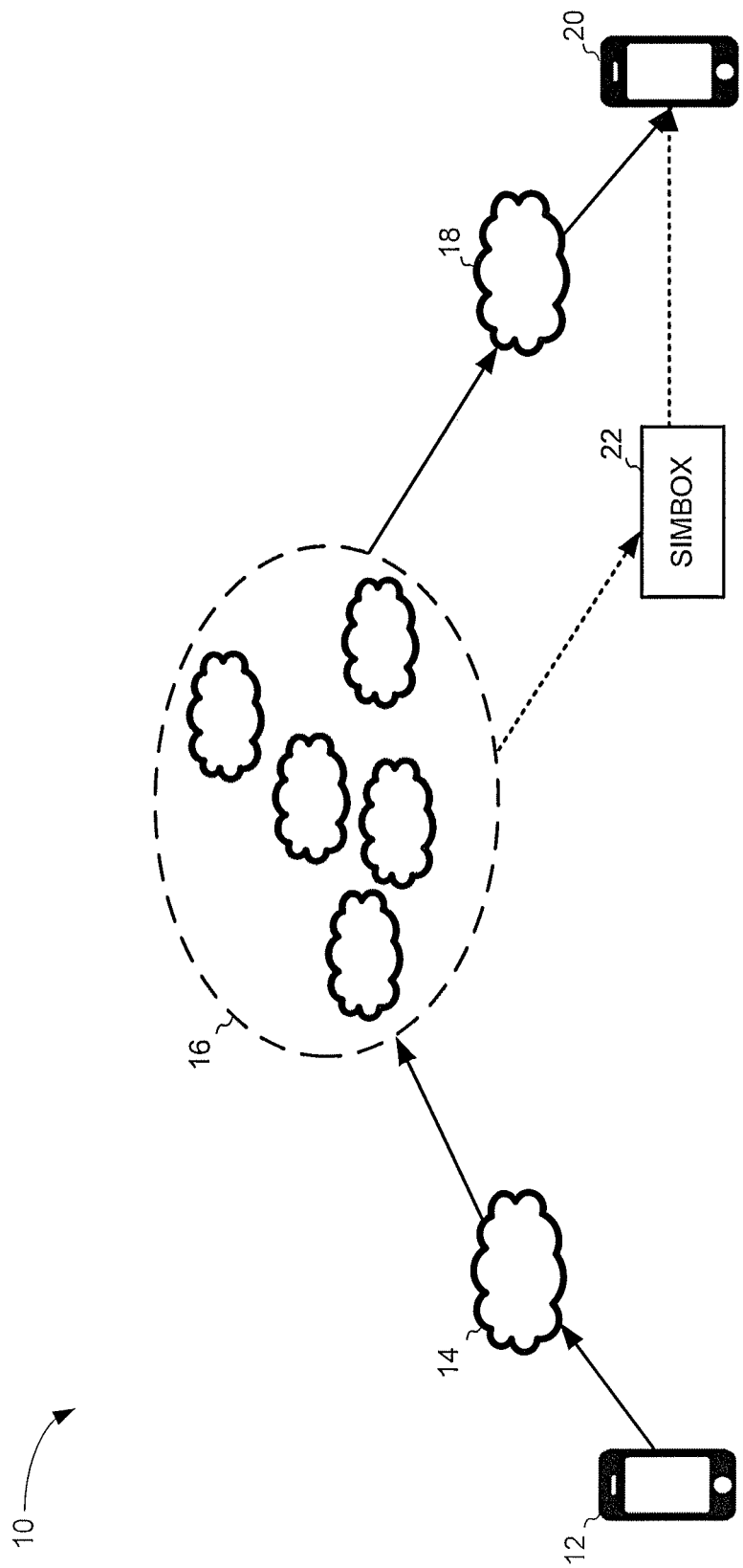
FIG. 1 illustrates a calling network diverted by a SIMbox, which is known in the art.

The disclosed technique overcomes the disadvantages of the prior art by using a distributed ledger for managing and enforcing a series of smart contracts to govern the transmission of information along a communication path in a communication network. The smart contracts are established sequentially between each pair of adjacent operators of the communication path when the communication path is established. The information cannot be transmitted along the communication path until 1) each operator of the communication path has entered into a smart contract with the next sequential operator, and 2) each smart contract is registered with a contract governing the communication path, referred to hereon as the 'governing contract'. In this manner, a tamper-proof chain of smart contracts is established that tracks the transmission of the information along the communication path. The governing contract references the originating operator for the session, allowing each subsequent operator of the communication path to verify the source of the information. This can prevent an agent from diverting the communication path in an attempt to falsify the origin of the information to make it appear as though it originated locally. For example, the information may be a telephone call or an instant message (SMS) for which the operators along the communication path are entitled to payment. A diversion of the communication path that falsifies the originating operator to make it appear as though the information originated locally to the end user can prevent the terminating operator from collecting fair payment for receiving and forwarding the information.

The distributed ledger preserves anonymity along the communication path such that each operator only knows the identity and transaction details of the adjacent operators, in addition to the identities of the originating operator and the terminating operator. This ensures routing transparency and privacy. When the communications session terminates, details of the communications session, such as communication time, bandwidth consumption, ratings for the service provided by the various operators along the communication path, and the like, are recorded on the distributed ledger, in association with the governing contract. The governing contract settles the terms defined in each registered smart contract, based on the details of the communications session. In this manner, each operator is automatically rewarded according to the terms of the smart contract closed with the adjacent operator as a function of the details of the communications session. Settlement may be implemented using at least a portion of one or more tokens provided by the distributed ledger and may subsequently be exchanged for fiat currency. Settlement may be instant, or delayed according to the terms stipulated by the smart contracts. Settlement may also be netted, for example if a first operator owes a second operator payment for one session, and the second operator owes the first operator for another session.

The establishment of the smart contracts is embedded within the communication protocol for establishing the communications session. The techniques described herein may be embedded within any communication protocol, including, but not limited to: voice-based telecommunications sessions, phone-based text messages (SMS) using standard protocols, such as SMPP (short message peer to peer), HTTP (hypertext transfer protocol), HTTPS (hypertext transfer protocol secure), SS7 (signaling system number 7), as well as VoIP (voice over IP protocols), and the like.

Figure 2A:
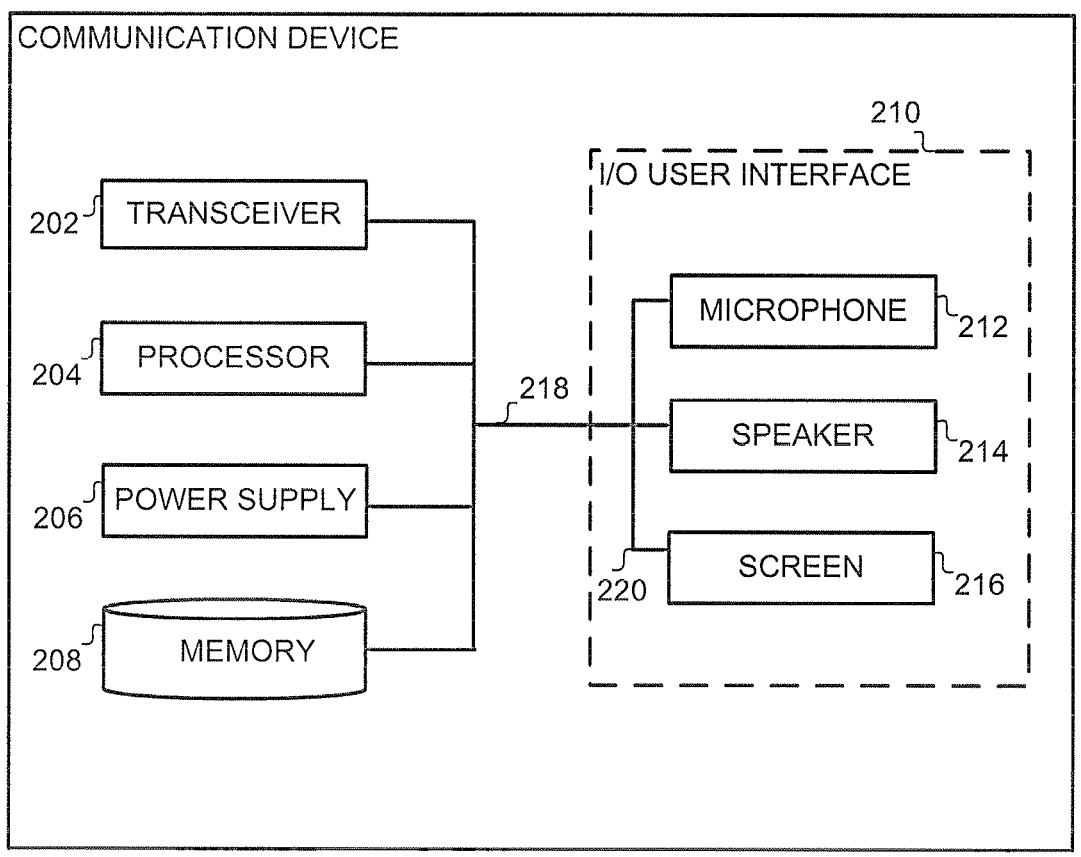
FIG. 2A is a schematic block diagram of a communication device, constructed and operative in accordance with an embodiment of the disclosed technique.

Reference is now made to FIG. 2A, which is a schematic block diagram of a communication device 200, constructed and operative in accordance with an embodiment of the disclosed technique. Communications device 200 includes a transceiver 202; a processor 204; a power supply 206; a memory 208, and an input/output (I/O) interface 210. I/O interface 210 may include any of a microphone 212, a speaker 214, and a screen 216. Transceiver 202, processor 204, power supply 206, memory 208, and I/O interface 210 are electrically coupled via a bus 218. Microphone 212, speaker 214, and screen 216 are electrically coupled via a bus 220. System 200 is but an exemplary implementation of a communications device and is not intended to limit the invention to any specific embodiment.

Communications device 200 is configured to operate as an end user device, such as to initiate and terminate communication such as telephone calls, email messages, SMS messages, VoIP calls, chat sessions, and the like. Communications device 200 may be any of: a cellular phone, a laptop computer, a desktop computer, a tablet computer, and the like. Transceiver 202 is configured to communicate via short, medium and long wavelength radio signals, such as to communicate with a base transmitter station, by converting electrical signals to radio signals, and the reverse. Processor 204 includes one or more local or remote cloud-based microprocessors that control communications device 200, and control the flow of data to and from communications device 200. Memory 208 is a computer-readable medium, including one or more of a random access memory (RAM), read-only memory ("ROM), a local or remote cloud-based storage device, and a removable storage device. Microphone 212 is configured to detect voice signals and convert these to a format suitable for transmission, i.e. by converting the voice signal to an electric signal, or to a radio signal for transmitting via transceiver 202. Speaker 214 is configured to convert an electric signal to an audio signal. Screen 216 is configured to display data and receive user input via one or more buttons and touch sensitive sensors (not shown).

Figure 2B:
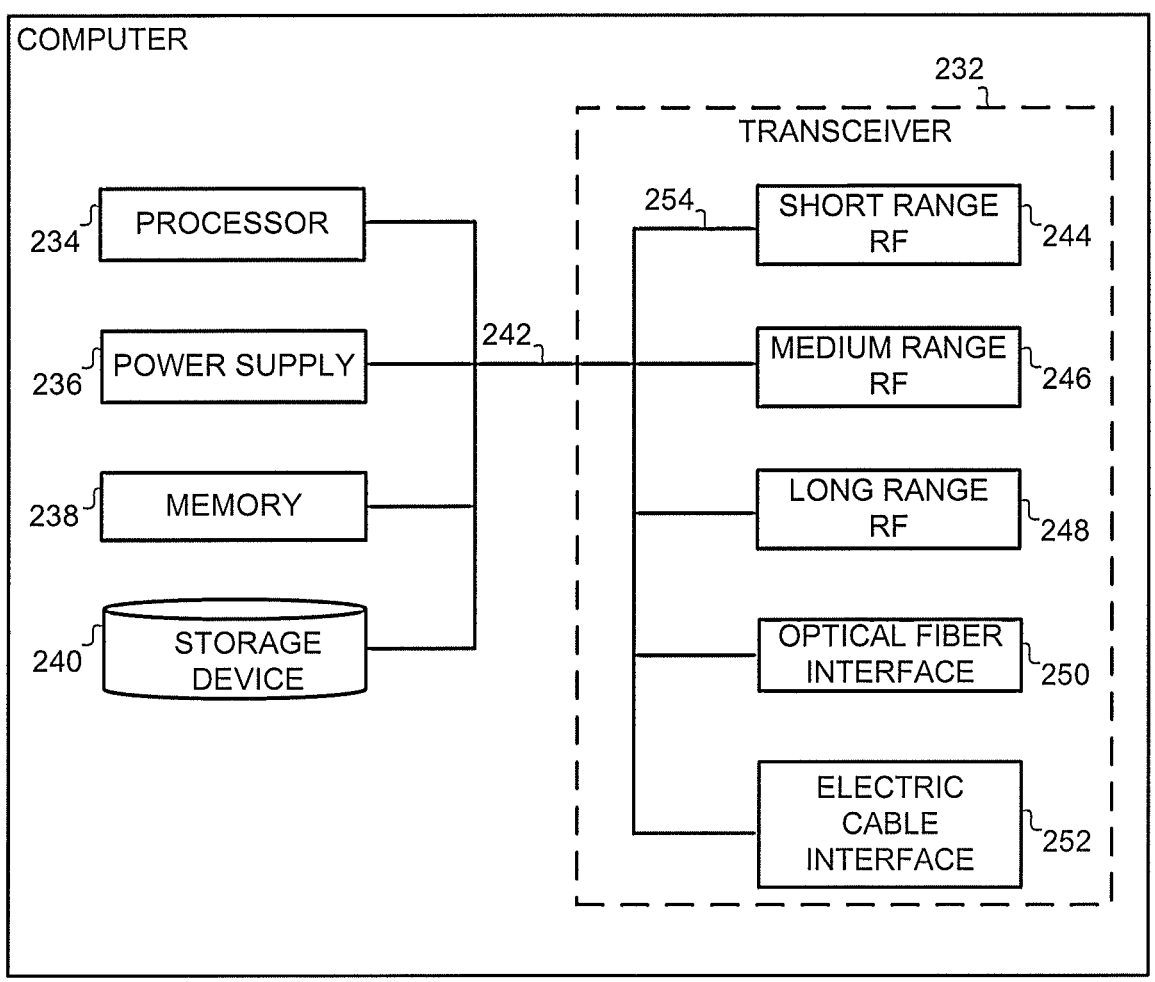
FIG. 2B is a schematic block diagram of a computer, constructed and operative in accordance with another embodiment of the disclosed technique.

Reference is now made to FIG. 2B, which is a schematic block diagram of a computer 230, constructed and operative in accordance with another embodiment of the disclosed technique. Computer 230 is configured to operate as a switching operator along a communication path, and may be incorporated into a communications server, a communications switch, a communications router, and the like. Computer 230 includes a transceiver 232, a processor 234, a power supply 236, a memory 238, and a storage device 240. Transceiver 232, processor 234, power supply 236, memory 238, and storage device 240 are electrically coupled via a communications bus 242. Processor 234 includes one or more local or remote cloud-based microprocessors for processing data and controlling the flow of data to and from computer 230. Memory 238 is a computer-readable medium, including one or more of a random access memory (RAM), read-only memory ("ROM) for storing one or more program code instructions for execution by processor 234. Storage device 240 is a computer-readable medium, and may include one or more local disks or cloud-based storage units that together are configured to store data, such as lists pertaining to subscriber information, network information, routing information, and additional data necessary for establishing, maintaining, and terminating a communication path.

Transceiver 232 includes one or more radio receivers, such as a short range radio transceiver 244, a medium range radio transceiver 246, a long range radio transceiver 248, Transceiver 232 additionally includes an optical fiber interface 250 for receiving one or more optical signals via fiber optic cable, and an electric cable interface 252 for receiving one or more electromagnetic signals via an electric cable. Short range radio transceiver 244, medium range radio transceiver 246, long range radio transceiver 248, optical fiber interface 250, and electric cable interface 252 are electrically coupled via a bus 254. Transceiver 232 is configured to send and receive data to according to any known wired and/or wireless protocol. In particular, short range radio transceiver 244, medium range radio transceiver 246, and long range radio transceiver 248 are configured to communicate with other computers, such as an instance of computer 230 or communications device 200 (FIG. 2A) via wireless antenna. Optical fiber interface 250 and electric cable interface 252 are configured to send and receive data to and from other computers, such as an instance of computer 230 or communications device 200, via wired communication protocols. It is to be noted that computer 230 is but an exemplary implementation of a node in a communication network, and is not intended to limit the invention to any specific embodiment.

Figure 2C:
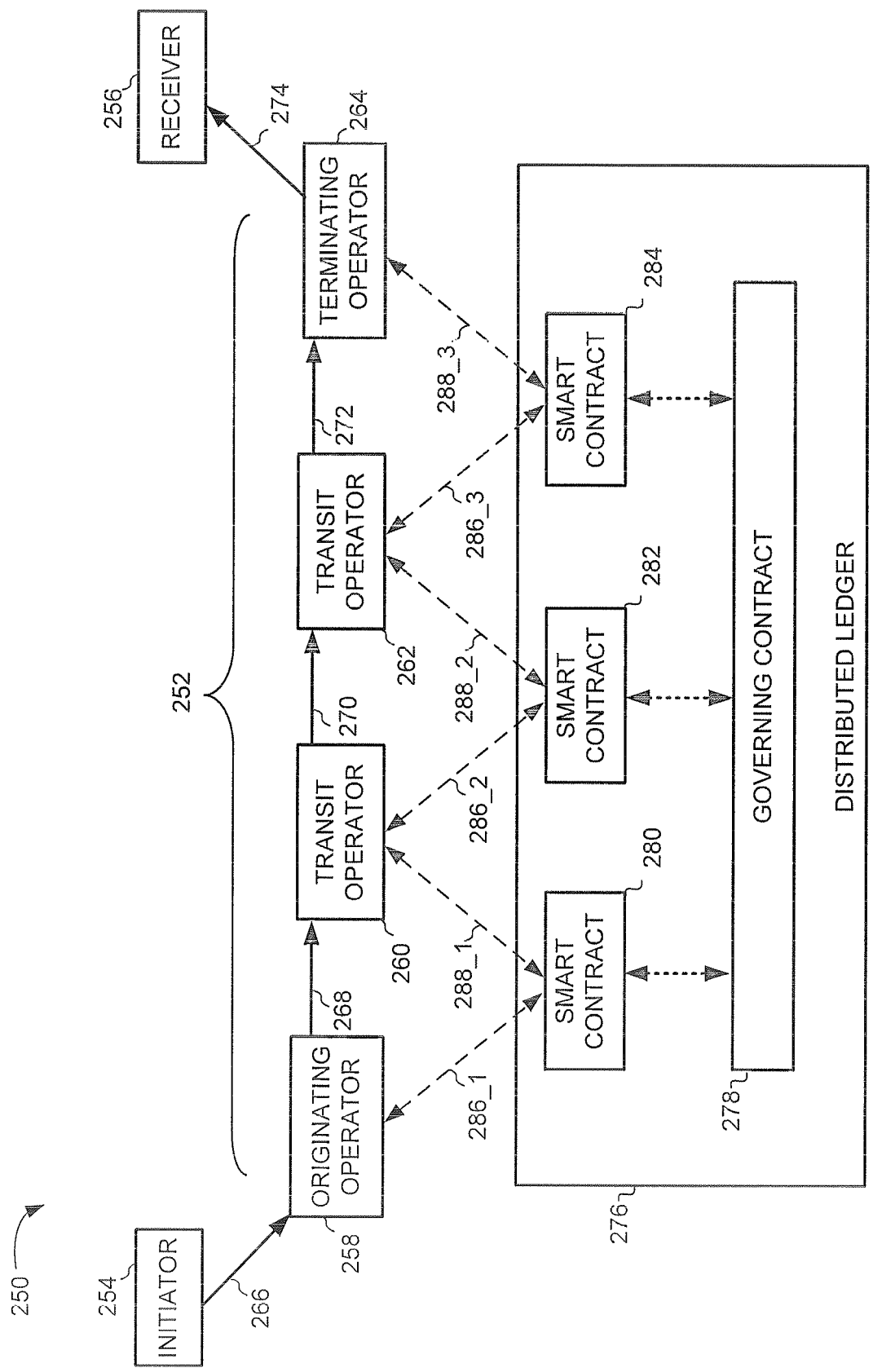
FIG. 2C illustrates an exemplary schematic block diagram of a communications system, constructed and operative in accordance with a further embodiment of the disclosed technique.

Reference is now made to FIG. 2C, which illustrates an exemplary schematic block diagram of a communications system, generally referenced 250, constructed and operative in accordance with a further embodiment of the disclosed technique. System 250 includes an initiating device 254, a receiving device 256, an originating operator 258, a transit operator 260, a transit operator 262, and a terminating operator 264. Initiating device 254 and receiving device 256 may be instances of communication device 200 (FIG. 2A). Originating operator 258, transit operator 260, transit operator 262, and terminating operator 264 may be instances of computer 230 (FIG. 2B). System 250 additionally includes a distributed ledger 276 for tracking communication between initiating device 254 and receiving device 256, for example to prevent a fraudulent diversion.

Initiating device 254 communicates with originating operator 258 via a channel 266. Receiving device 256 communicates with terminating operator 264 via a channel 274. Transit operator 260 and transit operator 262 belong to a communication network, such as network 16 of FIG. 1, connecting an originating network, (e.g. network 14 of FIG. 1), operated by originating operator 258 with a terminating network, (e.g. network 18 of FIG. 1), operated by terminating operator 264.

Originating operator 258 communicates with terminating operator 264 via transit operator 260 and transit operator 262 over a communication path 252. Communication path 252 is formed from channels 268, 270 and 272. Channel 268 connects originating operator 258 with transit operator 260, channel 270 connects transit operator 260 with transit operator 262, and channel 272 connects transit operator 262 with terminating operator 264. Thus, communication path 252 connects initiating device 254 with receiving device 256 over the communication network via the sequence of operators comprising originating operator 258, transit operator 260, transit operator 262, and terminating operator 264. Although the exemplary implementation of FIG. 2C shows two transit operators 260 and 262, but this is not intended to be limiting, and communication path 252 may include more or fewer operators. Additionally, although channels 266, 268, 270, 272, and 274 are indicated with one-way solid arrows, in some embodiments, the arrows may be two-way, allowing communication to flow in reverse.

Upon receiving a message destined for receiving device 256 from initiating device 254 via channel 266, originating operator 258 transfers the message to transit operator 260 via channel 268, which transfers the message along channel 270 to transit operator 262, which transfers the message to terminating operator along channel 272. Terminating operator 264 transfers the message to receiver 256. Similarly, communication may flow from receiving device 256 to initiating device 254 over communication path 252.

To prevent a diversion of the communication, each of originating operator 258, transit operators 260, 262, and terminating operator 264 communicate with distributed ledger 276. Distributed ledger 276 is implemented over multiple distributed computers, such as computer 200 of FIG. 2A and/or computer 230 of FIG. 2B, using conventional techniques. Distributed ledger 276 maintains a governing contract 278 for governing communication along communication path 252. Governing contract 278 is a smart contract implemented using conventional cryptographic protocols for distributed ledgers. To establish any of channels 268 to 272 between each pair of consecutive operators of communication path 252, each adjacent pair of operators engages in a smart contract (e.g. smart contracts 280, 282, and 284), and registers each respective smart contract with governing contract 278. Communication can only proceed after receiving a confirmation that the respective smart contract has been successfully registered. Governing contract instructs smart contracts 280, 282, 284 to allocate one or more tokens for communication path 252. Distributed ledger 276 subsequently distributes at least a portion of the one or more tokens across the operators of communication path 252, in accordance with the terms of each smart contract 280, 282, and 284. The value of the token may be set to a single unit of fiat currency.

Distributed ledger 276 generates the tokens using conventional cryptographic techniques for mining cryptocurrency. When the communication session begins, at least a portion of a first token is allocated in association with communication path 252. While the communications session is in progress, additional tokens or portions thereof are allocated for each additional time unit, e.g. 1 minute, in association with the communications session. The tokens may be guaranteed by originating operator 258. The transfer of the tokens is registered on distributed ledger 276. In some embodiments, the tokens have a stable value corresponding to a predefined cost, such as one minute of a telephone call, or a transmission of an SMS.

A description of an exemplary implementation for establishing communication path 252 now follows. To communicate with receiving device 256, initiating device 254 sends a notification to originating operator 258. Originating operator 258 identifies receiving device 256 as a subscriber of the local network maintained by originating operator 258 (e.g. network 14 of FIG. 1) and receiving device 256 as a subscriber of a remote network maintained by terminating operator 264 (e.g. network 18 of FIG. 1). Thus, communication path 252, connecting initiating device 254 to receiving device 256, extends externally to the local network maintained by originating operator 258. Originating operator 258 establishes governing contract 278 to govern the communication session along communication path 252 between initiating device 254 and receiving device 256, e.g. by registering smart contracts to track each segment of the communication path, settle terms of the smart contracts, and the like. In some embodiments, originating operator 258 requests a verification for the identity of terminating operator 264. This may be implemented via governing contract 278.

Originating operator 258 determines that the next operator in communication path 252 is transit operator 260. For example, originating operator 258 may query a network table. In some embodiments, the network table may flag one or more geographical regions to avoid when establishing communication path 252, for example if certain regions are prone to fraud, or poor service, and the like. To establish channel 268 between originating operator 258 and transit operator 260, originating operator 258 and transit operator 260 engage in a first smart contract 280. Smart contract 280 is registered with governing contract 278, indicated by the dashed arrow connecting smart contract 280 with governing contract 278. The registration of smart contract 280 is implemented using protocols that preserve the anonymity of the contracting parties, and confidentiality regarding the terms of smart contract 280 from any other party registering a different smart contract with governing contract 278. Originating operator 258 receives a confirmation from distributed ledger 276 that smart contract 280 is registered with governing contract 278, indicated by a dashed arrow 286_1 between smart contract 280 and originating operator 258. On receiving the confirmation, originating operator 258 forwards the notification to transit operator 260 along channel 268, now governed by smart contract 280.

Transit operator 260 determines that the next operator in communication path 252 is transit operator 262. Transit operator 260 may query a network table, which may flag one or more geographical regions as prone to fraud, or poor service, and the like. Prior to establishing channel 270 to forward the notification to transit operator 262, transit operator 260 requests a confirmation from distributed ledger 276 that smart contract 280 is registered with governing contract 278. On receiving the confirmation, indicated with a dashed arrow 288_1 between smart contract 280 and transit operator 260, transit operator 260 proceeds to establish channel 270 with transit operator 262. In some embodiments, transit operator 260 additionally requests verification for the identity of terminating operator 264 and/or of originating operator 258, prior to establishing channel 270. This may be implemented via governing contract 278.

To establish channel 270, transit operator 260 and transit operator 262 engage in a second smart contract 282. Smart contract 282 is registered with governing contract 278, as indicated by the dashed arrow between smart contract 282 and governing contract 278. The registration of smart contract 282 is implemented using conventional distributed ledger protocols to preserve the anonymity of the contracting parties and confidentiality regarding the terms of smart contract 282 from other parties. Transit operator 260 receives a confirmation from distributed ledger 276 that smart contract 282 is registered with governing contract 278, indicated by a dashed arrow 286_2 between smart contract 282 and transit operator 260. Only after transit operator 260 receives the confirmation, does transit operator 260 forward the notification to transit operator 262 along channel 270, now governed by smart contract 282.

Transit operator 262 determines that the next operator in communication path 252 is terminating operator 264, such as by querying a network table that may flag certain geographical regions. Prior to establishing channel 272 with terminating operator 264, transit operator 262 requests a confirmation from distributed ledger 276 that smart contract 282 is registered with governing contract 278. On receiving the confirmation, indicated with a dashed arrow 288_2 between smart contract 282 and transit operator 262, transit operator 262 proceeds to establish channel 272 with terminating operator 264. In some embodiments, prior to establishing channel 272, transit operator 262 additionally requests verification for the identity of originating operator 258. This may be implemented via governing contract 276.

To establish channel 272, transit operator 262 and terminating operator 264 engage in a third smart contract 284. Smart contract 284 is registered with governing contract 278, as indicated by the dashed arrows between smart contract 284 and governing contract 278, using conventional cryptographic protocols for distributed ledgers that preserve the anonymity of the contracting parties and confidentiality regarding the terms of smart contract 284 from other parties. Transit operator 262 receives a confirmation from governing contract 278 that smart contract 284 is registered with governing contract 278, indicated with a dashed arrow 286_3 between smart contract 284 and transit operator 262. Only after transit operator 262 receives the confirmation, does transit operator 262 forward the notification to terminating operator 264 along channel 272, now governed by smart contract 284.

On receiving a confirmation from distributed ledger 276 that smart contract 284 is registered with governing contract 278 (dashed arrow 288_3 between smart contract 284 and terminating operator 264), terminating operator 264 transmits the notification to receiver 256 along channel 274. In some embodiments, prior to transmitting the notification to receiver 256, terminating operator verifies the identity of originating operator 258.

The establishment of each of smart contracts 280, 282, and 284 is embedded inside the communication protocol between each adjacent pair of the sequence of operators forming communication path 252 that connects initiating device 254 with receiving device 256. The channel between each adjacent pair of operators forms a portion of communication path 252, discussed in greater details with respect to FIGS. 3A-3D. Smart contracts 280, 282, and 284 form a secure chain to track communication along communication path 252 and prevent a diversion that would obfuscate the location of initiating device 254. For example, such a diversion might: prevent terminating operator 264 from a) receiving fair compensation for completing communication path 252; b) prevent law enforcement from tracking nefarious communication by criminals or terrorists; c) distort traffic patterns that are necessary for network maintenance, or d) provide substandard service to initiating device 254 and receiving device 256. By establishing smart contracts 280, 282, and 284 on distributed ledger 276, operators 258, 260, 262, and 264 are assured that channels 268, 270, and 272, governed by contracts 280, 282, and 284, respectively, are tamper-proof.

To maintain privacy and anonymity, each of operators 258, 260, 262, and 264 are only aware of adjacent operators, as well as originating operator 258 and terminating operator 264. Thus, originating operator is unaware of transit operator 262, and terminating operator 264 is unaware of transit operator 260. If communication path 252 included a third operator (not shown) between operators 260 and 262, then transit operator 260 would be unaware of transit operator 262, and vice versa. Additionally, each of operators 258, 260, 262, and 264 only know the terms of the contracts they are engaged in. Thus, originating operator 258 does not know the terms of smart contracts 282 and 284; transit operator 260 does not know the terms of smart contract 284; transit operator 262 does not know the terms of smart contract 280, and terminating operator 264 does not know the terms of smart contracts 280, and 282.

In some embodiments, originating operator 258 serves as a guarantor for the communications session, to assure each of operators 260, 262, and 264 that the communication path is legitimate. For example, such an assurance can guarantee each of operators 260, 262, and 264 that the communication will be accurately tracked, and they will each receive fair payment for their role in establishing communication path 252. In some embodiments, operators 260, 262, and 264 additionally condition the transfer of the notification along the communication path on the identity and reputation of originating operator 258. Originating operator 258 may guarantee to convert the one or more tokens issued as payment to fiat currency if any of operators 260, 262, and 264 wish to do so. The guarantee of payment in tokens is provided by smart contracts 280, 282, and 284 and distributed ledger 276.

On terminating the communications session, the session details are recorded in association with governing contract 278 on distributed ledger 276. Session details may include the session duration, the amount of information transferred (e.g. size of message), the quality of the transmission, and the like. Governing contract 278 may verify that the quality of the transmission meets the terms agreed upon when establishing communication path 252, and may condition settlement of smart contracts 280, 282, and 284 on this. Smart contracts 280, 282, and 284, governing channels 268, 270, and 272 connecting adjacent pair of operators 258 and 260; 260 and 262; and 262 and 264, respectively, are executed over distributed ledger 276. Smart contracts 280, 282, and 284 may stipulate payment for the respective roles of channels 268, 270, and 272 in forming communication path 252. Once the communications session has terminated and the session details are recorded with governing contract 278, the stipulated payment is distributed to originating operator 258, transit operator 260, transit operator 262, and terminating operator 264, according to the terms set by smart contracts 280, 282, and 284, respectively. In this manner, fraudulent diversion can be mitigated.

Figure 2D:
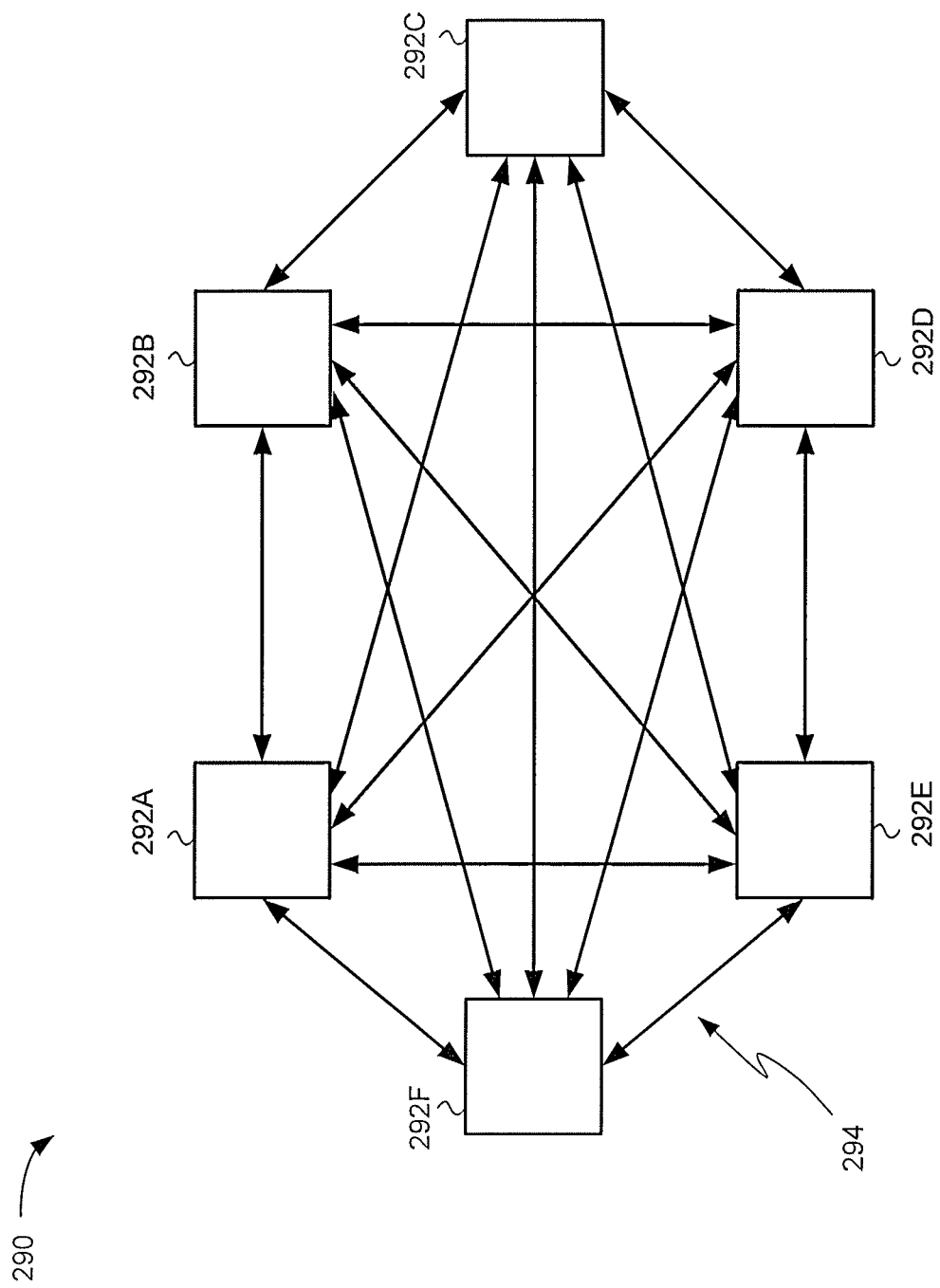
FIG. 2D is a schematic block diagram of a distributed ledger, constructed and operative in accordance with another embodiment of the disclosed technique.

Reference is now made to FIG. 2D, which is a schematic block diagram of a distributed ledger 290, constructed and operative in accordance with another embodiment of the disclosed technique. Distributed ledger 290 is intended as an exemplary representation of distributed ledger 276 of FIG. 2C. Distributed ledger 290 includes multiple nodes 292A through 292F. Each of nodes 292A through 292F is connected to each other one of nodes 292A through 292F via communications links 294, to maintain a Byzantine fault tolerance characteristic of distributed systems. Each of nodes 292A through 292F may be implemented by one or more of devices 200 (FIG. 2A) or device 230 (FIG. 2B). Nodes 292A through 292F communicate with each other using any suitable wired or wireless means, such as electric wire, cable, optical fiber, WiFi, BlueTooth, cellular, satellite, short, medium or long radio wave technologies, to name but a few. Each of nodes 292A through 292F is operative to execute a consensus-based algorithm to ensure the synchronized replication of data across distributed ledger 290. The consensus-based algorithm utilizes cryptographic protocols, such as digital signing, proof-of-work, proof-of-stake, voting, and the like, to maintain consistency between copies of data stored at each of nodes 292A through 292F, while maintaining anonymity, confidentiality, and privacy characteristics of distributed ledger technologies. Each of nodes 292A through 292F may execute instructions for one or more smart contracts, such as smart contracts 278, 280, 282, and 284 (FIG. 2C), to initiate, register, and confirm a smart contract and settle one or more terms of a smart contract. Each of nodes 292A through 292F is operative to mine one or more cryptocurrency tokens, and use the tokens to settle the terms of the smart contracts.

Reference is now made to FIGS. 3A-3D, which taken together, illustrate a hybrid protocol, generally referenced 300, for establishing and tracking a call session using the system of FIG. 2C, constructed and operative in accordance with a further embodiment of the disclosed technique. Hybrid protocol 300 illustrates a sequence of messages exchanged over time between multiple devices and operators of a communication network. Hybrid protocol 300 embeds a novel protocol (dashed lines with fletched arrowheads) for establishing the smart contracts of FIG. 2A, within a standard protocol (solid lines, filled arrowheads), such as the Session Initiation Protocol (SIP) commonly used for telecommunications. FIGS. 3A-3D are intended as an exemplary implementation for the hybrid protocol, and are not intended to limit the invention to the specific details described herein.

To track hybrid protocol 300 with respect to system 250 of FIG. 2C, an initiating device 302 corresponds to initiating device 254, a receiving device 306 corresponds to receiving device 256; an originating operator 308 corresponds to originating operator 258, a first transit operator 310 corresponds to transit operator 260, a second transit operator 312 corresponds to transit operator 262, and a terminating operator 314 corresponds to terminating operator 264. First smart contract 320 corresponds to smart contract 280, second smart contract 322 corresponds to smart contract 282, third smart contract 324 corresponds to smart contract 284, and governing contract 318 corresponds to governing contract 278. Messages exchanged relating to the standard protocol, are indicated with solid lines with filled arrowheads. Messages relating to the novel protocol are indicated with dashed lines and fletched arrowheads.

The novel protocol of hybrid protocol 300 includes messages exchanged with governing contract 318 for establishing first smart contract 320, second smart contract 322, and third smart contract 324. The novel protocol is embedded within the standard protocol. Smart contracts 320, 322, and 324 are transaction protocols executable via a distributed ledger technology (DLT), such as distributed ledger 276 (FIG. 2C), to settle the terms agreed between each adjacent pair of operators along the communication path connecting initiating device 302 to receiving device 306. Thus, first smart contract 320 enforces the terms agreed to between originating operator 308 and first transit operator 310; second smart contract 322 enforces the terms agreed to between first transit operator 310 and second transit operator 312; and third smart contract 324 enforces the terms agreed to between second transit operator 312 and terminating operator 314. Governing contract 318 is a transaction protocol executable via distributed ledger 276 that oversees the establishment of each of smart contracts 320, 322, and 324 in a manner to coordinate the establishment of a chain of smart contracts that track the communication path while maintaining anonymity and isolation. Anonymity ensures that each operator of the communication path can only identify immediately neighboring operators, as well as originating operator 308 and terminating operator 314. Isolation ensures that each operator is only aware of the contractual terms it is party to.

Figure 3A:
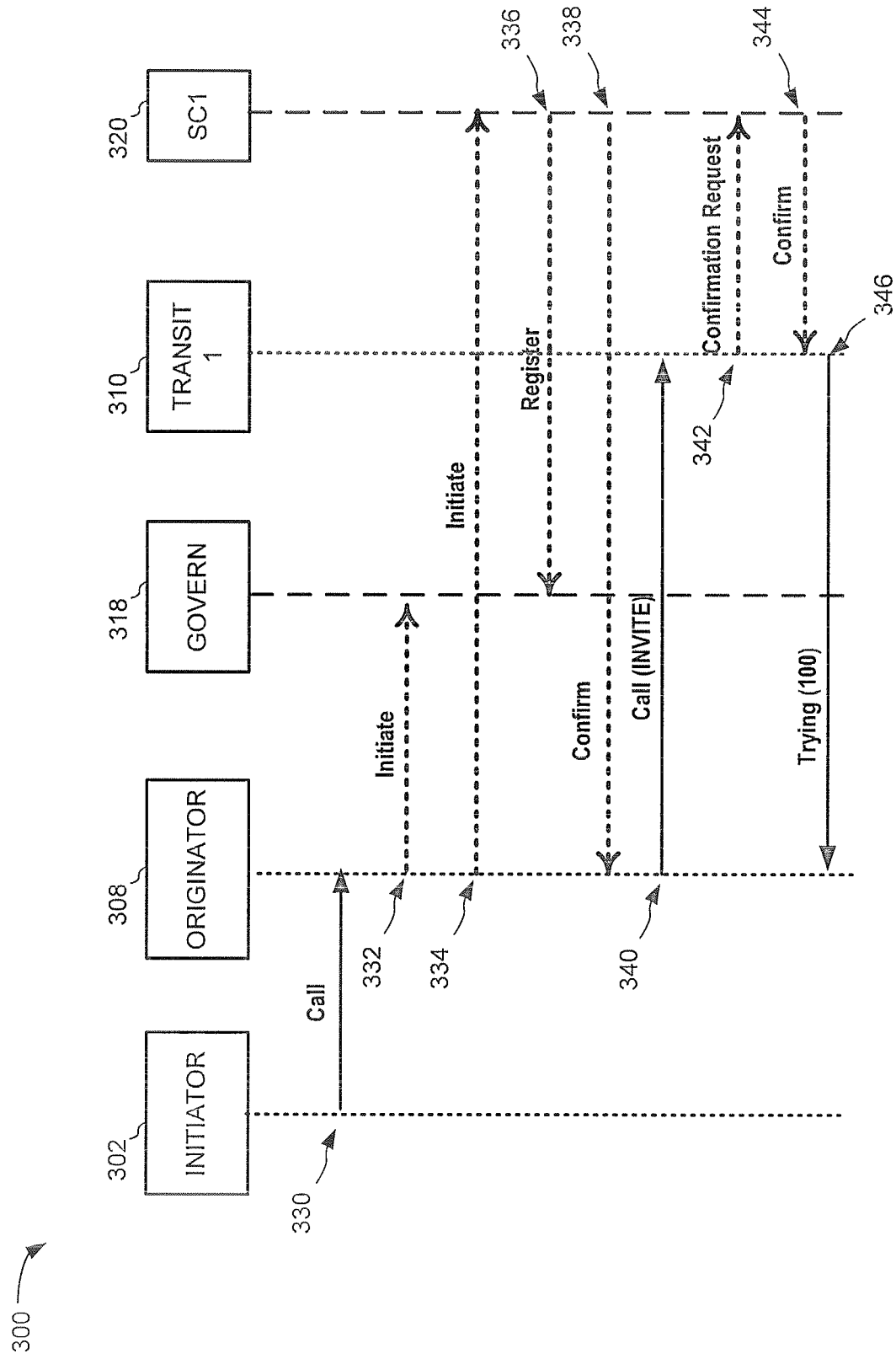
FIGS. 3A-3D, taken together, illustrate a hybrid communication protocol for establishing and tracking a call session using the system of FIG. 2C, constructed and operative in accordance with a further embodiment of the disclosed technique.

Referring to FIG. 3A, in accordance with the standard protocol, initiating device 302 sends a call request to originating operator 308 (Step 330). However, before the call request can be forwarded along the communication path, originating operator 308 first establishes a smart contract with the next operator, according to the novel protocol.

Figure 3B:
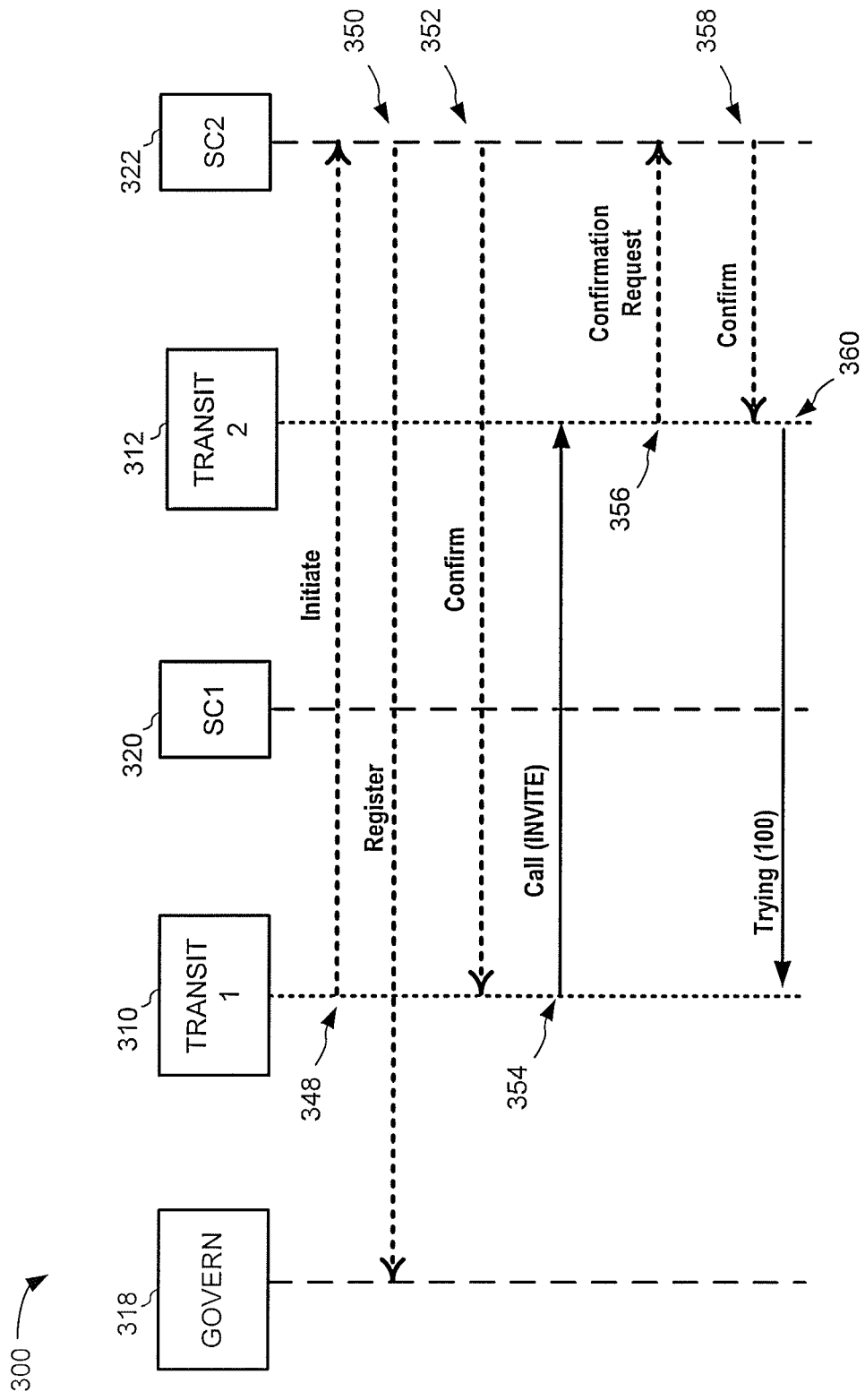

In accordance with the novel protocol, originating operator 308 initiates governing contract 318 for governing the smart contracts tracking the communication session between initiating device 302 and receiving device 306, shown in FIG. 3B (Step 332). Governing contract 318 is a smart contract established via a distributed ledger, such as distributed ledger 276 of FIG. 2C. Originating operator 308 initiates a first smart contract 320 for governing the communication channel between originating operator 308 and first transit operator 310 (e.g. channel 268 of FIG. 2C) (Step 334). First smart contract 320 defines the terms agreed to between originating operator 308 and first transit operator 310, such as payment terms, bandwidth allocation and the like. In some embodiments, first contract 320 credits originating operator 308 with at least a portion of a token for subsequently settling payment for the call. First smart contract 320 is registered to governing contract 318 via the distributed ledger (Step 336). Originating operator 308 receives a confirmation that first smart contract 320 has been registered with governing contract 318 (Step 338), indicated in FIG. 2C with arrow 286_1. On receiving a confirmation that first smart contract 320 is successfully registered with governing contract 318, originating operator 308 continues the standard protocol to establish the call.

In accordance with the standard protocol, originating operator 308 forwards the call request to first transit operator 310 (Step 340). However, before proceeding with the standard protocol, first transit operator 310 must first receive a confirmation that first smart contract 320 has been registered to governing contract 318, according to the novel protocol.

In accordance with the novel protocol, first transit operator 310 requests a confirmation from the distributed ledger that first smart contract 320 is registered to governing contract 318 (Step 342). First transit operator 310 receives the confirmation that first smart contract 320 is registered to governing contract 318 (Step 344). This is indicated in FIG. 2C by arrow 288_1. Once first transit operator 310 is assured that first smart contract 320 is successfully registered, first transit operator 310 continues with the standard protocol.

In accordance with the standard protocol, first transit operator 310 sends originating operator 308 a 'Trying' message (Step 346). Protocol 300 continues on FIG. 3B, in accordance with the novel protocol.

Referring to FIG. 3B, in accordance with the novel protocol, first transit operator 310 initiates second smart contract 322 for governing the communication channel between first transit operator 310 and second transit operator 312 (e.g. channel 270 of FIG. 2C) (Step 348). Second smart contract 322 defines the terms agreed to between first transit operator 310 and second transit operator 312, such as payment terms and the like. Second smart contract 322 is registered to governing contract 318 via the distributed ledger (Step 350). First transit operator 310 receives a confirmation that second smart contract 322 has been registered with governing contract 318 (Step 352), (arrow 286_2 of FIG. 2C). On receiving a confirmation that second smart contract 322 is successfully registered with governing contract 318, first transit operator 310 continues the standard protocol to establish the call.

In accordance with the standard protocol, first transit operator 310 forwards the call request to second transit operator 312 (Step 354). However, before proceeding with the standard protocol, second transit operator 312 must first receive a confirmation that second smart contract 322 has been registered to governing contract 318, according to the novel protocol.

In accordance with the novel protocol, second transit operator 312 requests a confirmation from the distributed ledger that second smart contract 322 is registered to governing contract 318 (Step 356). Second transit operator 312 receives the confirmation that second smart contract 322 is registered to governing contract 318 (Step 358), (arrow 288_2 of FIG. 2C). Once second transit operator 312 is assured that second smart contract 322 is successfully registered, second transit operator 312 continues with the standard protocol.

In accordance with the standard protocol, second transit operator 312 sends first transit operator 310 a 'Trying' message (Step 360). The protocol continues on FIG. 3C.

Figure 3C:
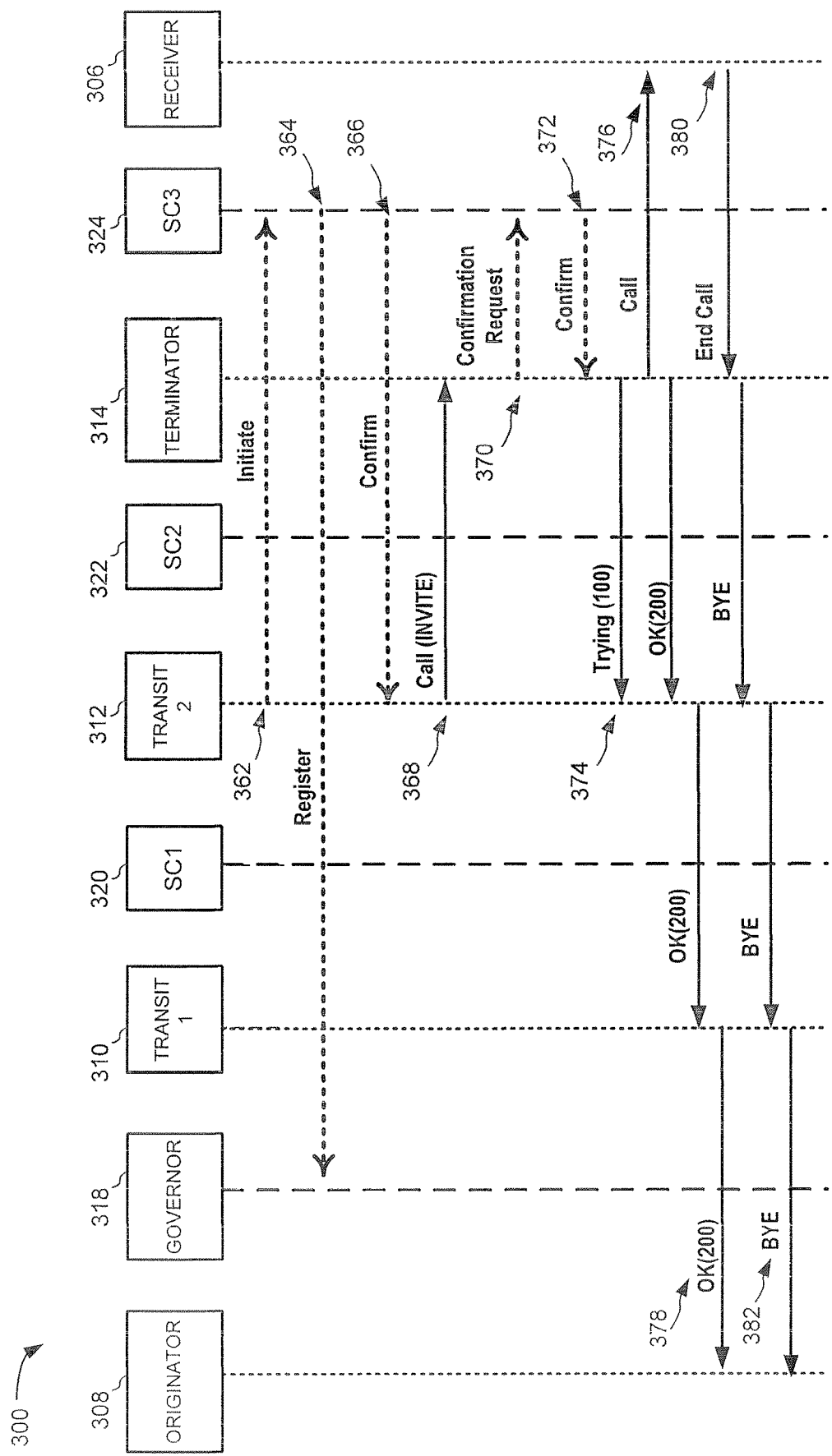

Referring to FIG. 3C, in accordance with the novel protocol, second transit operator 312 initiates third smart contract 324 for governing the communication channel between second transit operator 312 and terminating operator 314 (e.g. channel 272 between transit operator 262 and terminating operator 264 of FIG. 2C) (Step 362). Third smart contract 324 defines the terms agreed to between second transit operator 312 and terminating operator 314, such as payment terms and the like. Third smart contract 324 is registered to governing contract 318 via the distributed ledger (Step 364). Second transit operator 312 receives a confirmation that third smart contract 324 has been registered with governing contract 318 (Step 366), (e.g. arrow 286_3 of FIG. 2C). On receiving a confirmation that third smart contract 324 is successfully registered with governing contract 318, second transit operator 312 continues the standard protocol to establish the call.

In accordance with the standard protocol, second transit operator 312 forwards the call request to transit operator 314 (Step 368). However, before proceeding with the standard protocol, terminating operator 314 must first receive a confirmation that third smart contract 324 has been registered to governing contract 318, according to the novel protocol.

In accordance with the novel protocol, terminating operator 314 requests a confirmation from the distributed ledger that third smart contract 324 is registered to governing contract 318 (Step 370). Terminating operator 314 receives the confirmation that third smart contract 324 is registered to governing contract 318 (Step 372), (e.g. arrow 288_3 of FIG. 2C). Once terminating operator 314 is assured that third smart contract 324 is successfully registered, terminating operator 314 continues with the standard protocol.

In some embodiments (not shown), terminating operator 314 requests a verification of the identity of initiator 302 who originated the call session, and a verification of the identity of originating operator 308, who is providing the guarantee for payment of the call session. The request is implemented via governing contract 318. Terminating operator 314 sends a verification request message to governing contract 318. Governing contract 318 forwards the verification request message to originating operator 308. Originating operator 308 responds to the verification request message by referencing publicly available records. Once identity of the originator of the call session and the identity of originating operator 308 has been confirmed, governing contract 318 sends terminating operator 314 a confirmation to the verification request message. In some embodiments, terminating operator 314 is additionally equipped with a module to receive the verification of the identity of the originating operator 308, and notify receiver 306 about verification status In accordance with the standard protocol, terminating operator 314 sends second transit operator 312 a 'Trying' message (Step 374), and connects the call to receiving device 306 (Step 376). Once the call is connected, terminating operator 314 sends an OK message to second transit operator 312. Second transit operator 312 recognizes that the OK message is associated with the communications session governed by third smart contract 324 (i.e. with terminator 314) and with second smart contract 322 (i.e. with first transit operator 310), and forwards the OK message to first transit operator 310. First transit operator 310 recognizes that the OK message is associated with the communications session governed by second smart contract 322 (with second transit operator 312) and with first smart contract 320 (with originating operator 308) and forwards the OK message to originating operator 308 (Step 378). The registration of smart contracts 320, 322 and 324 with governing contract 318 enables communication to flow along the communication path (e.g. path 252 of FIG. 2C) connecting initiating device 302 with receiving device 306.

When the communications session terminates, receiving device 306 sends terminating operator 314 an 'end call' message (Step 380). As with sending the OK message in Step 368, terminating operator 314 recognize that the 'end call' message is associated with the communications session governed by third smart contract 324 (i.e. with second transit operator 312) and sends a BYE message to second transit operator 312; second transit operator 312 recognize that the BYE message is associated with the communications session governed by third smart contract 324 (i.e. with terminating operator 314) and with second smart contract 322 (i.e. with first transit operator 310), and sends the message to first transit operator 310; and first transit operator 310 recognize that the BYE message is associated with the communications session governed by second smart contract 322 (i.e. with second transit operator 312) and with first smart contract 320 (with originating operator 308), and forwards the BYE message to originating operator 308, following the standard protocol to terminate the communications session (Step 382).

Figure 3D:
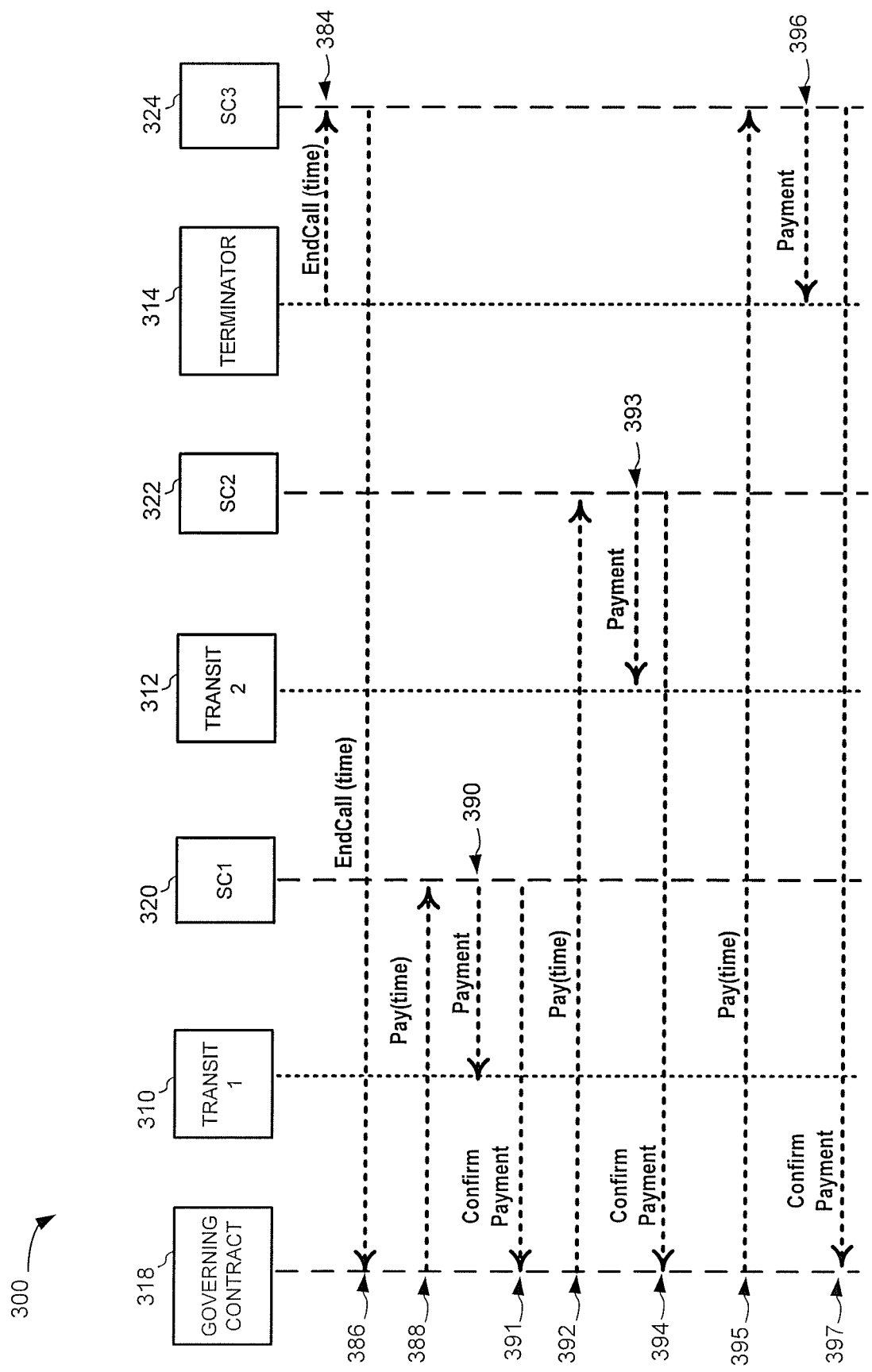

In some embodiments, to settle the terms of the communications session, the protocol proceeds with the novel protocol in FIG. 3D. It is to be noted that settling financial terms for the communications session is but one embodiment and is not intended to limit the invention to this application.

Referring to FIG. 3D, in accordance with the novel protocol, terminating operator 314 notifies third smart contract 324 of the termination time for the call (Step 384). It is to be noted that terminating operator 314 may perform Step 374 after forwarding the BYE message to second transit operator 312 during Step 372. Third smart contract 324 registers the termination time for the call with governing contract 318 (Step 386).

The novel protocol proceeds as follows:

To settle payments, governing contract 318 notifies first smart contract 320 of the call duration, according to which payment will be transferred, according to the terms of first contract 320 (Step 388). First smart contract 320 transfer at least a portion of a token from originating operator 308 to first transit operator 310 according to the terms specified in first smart contract 320 (Step 390). First smart contract 320 sends governing contract 318 a confirmation of the transfer (Step 391). Governing contract 318 notifies second smart contract 322 of the call duration according to which payment will be transferred, according to the terms of second smart contract 322 (Step 392). Second smart contract 322 transfers at least a portion of a token from first transit operator 310 to second transit operator 312 according to the terms in second smart contract 322 (Step 393). Second smart contract 322 sends governing contract 318 a confirmation of the transfer (Step 394). Governing contract 318 notifies third smart contract 324 of the call duration, according to which payment will be transferred according to the terms of third smart contract 324 (Step 395). Third smart contract 324 transfers at least a portion of a token from second transit operator 312 to terminating operator 314 in accordance with the terms of third smart contract 324 (Step 396). Third smart contract 324 sends governing contract 318 a confirmation of the transfer (Step 397). Any of first transit operator 310, second transit operator 312 and terminating operator 314 may request from originating operator 308 to redeem their respective tokens or portions thereof for fiat currency.

Figure 4A:
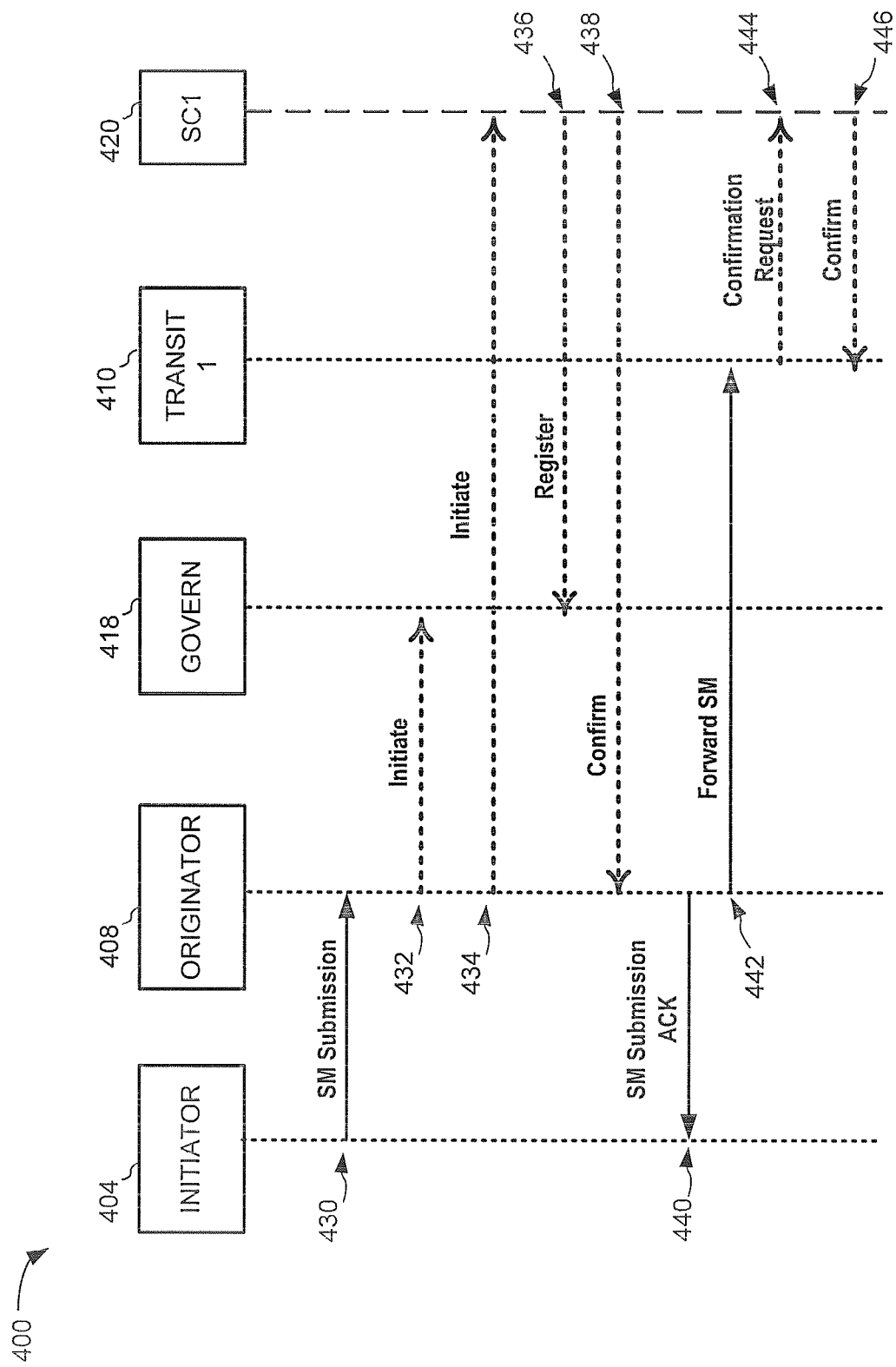
FIGS. 4A-4C, taken together, illustrate a hybrid instant messaging (IM) protocol for establishing and tracking the transmission of a short messaging (SM) using the system of FIG. 2C, constructed and operative in accordance with another embodiment of the disclosed technique.
Figure 4B:
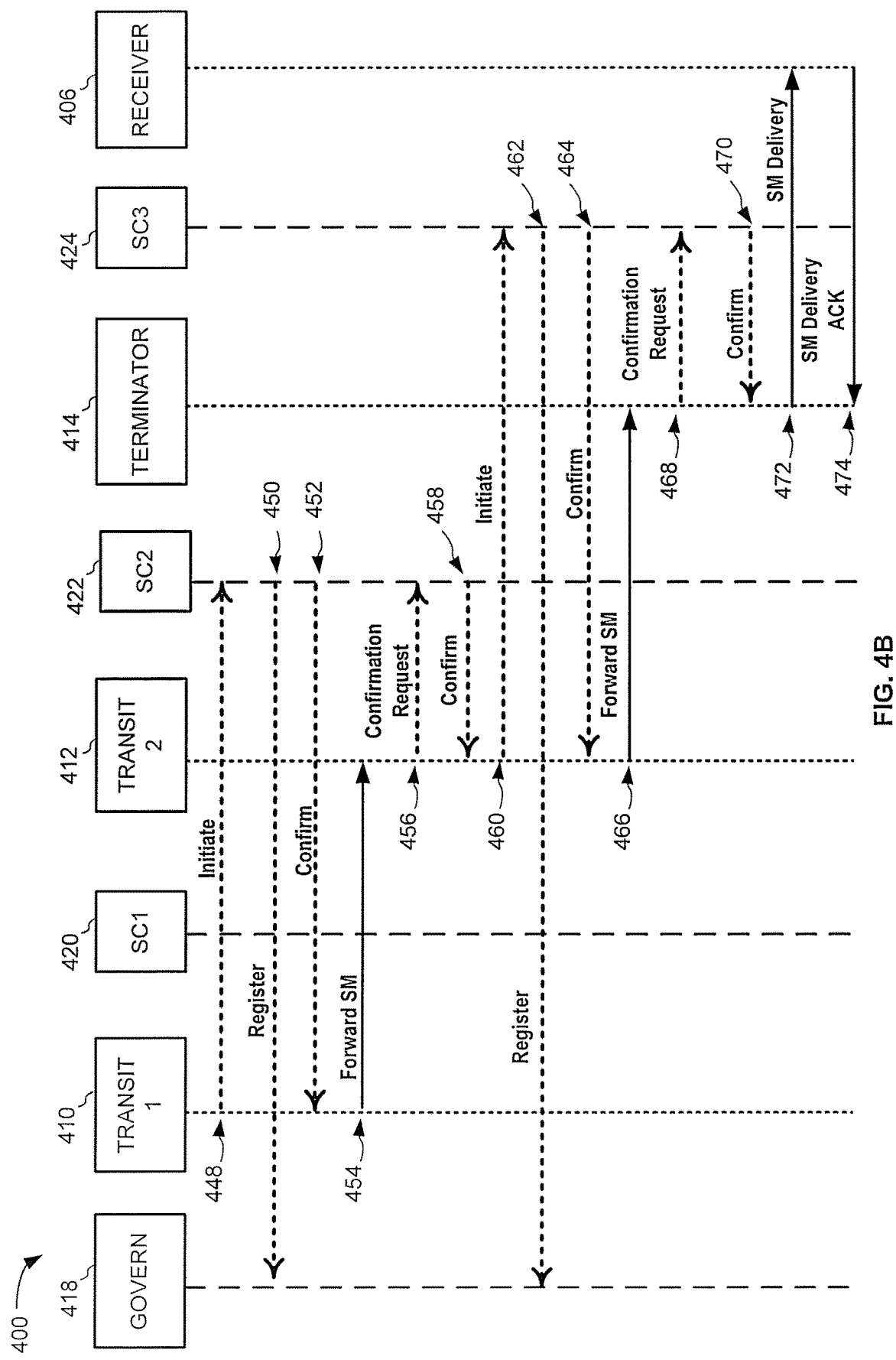
Figure 4C:
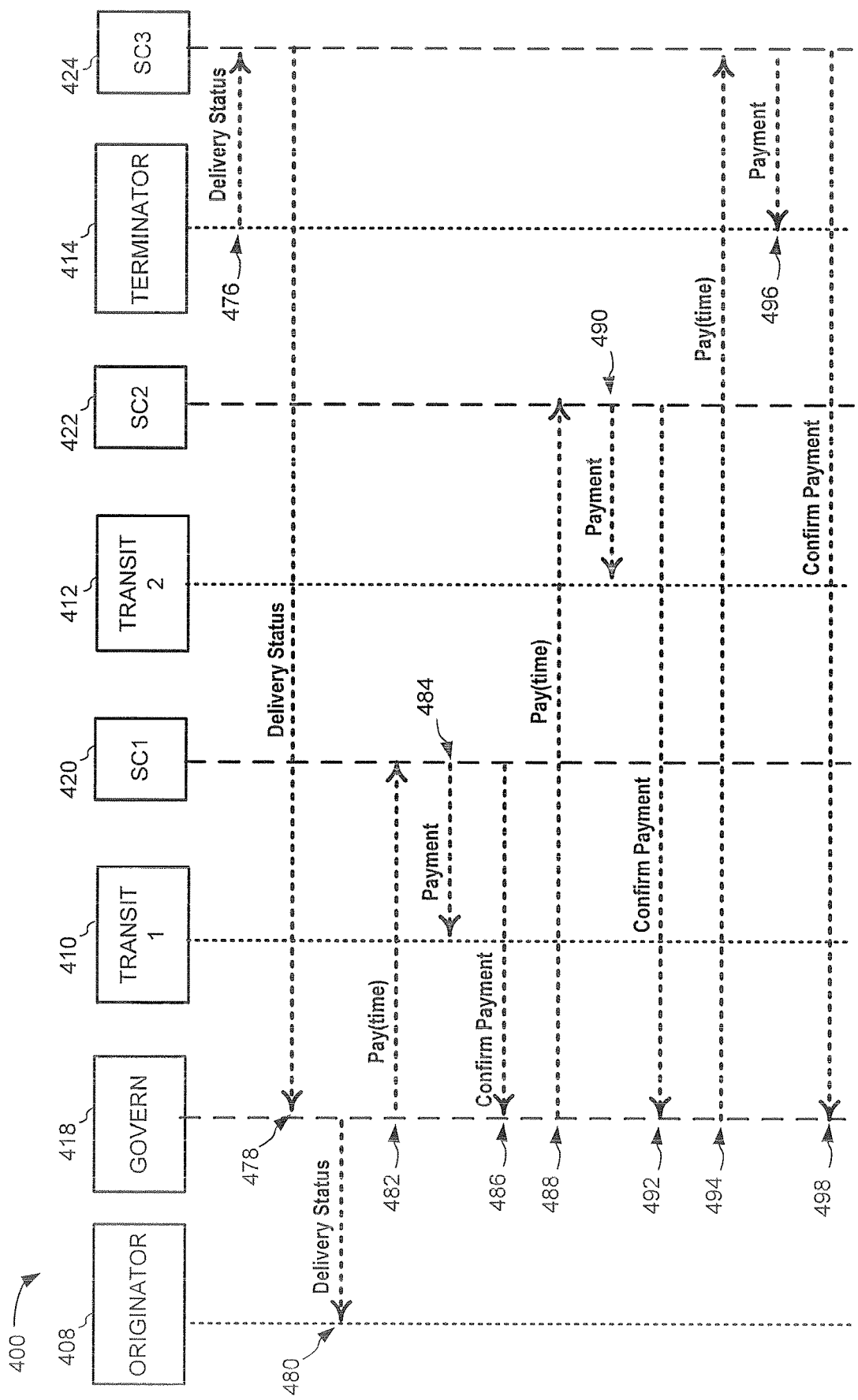

Reference is now made to FIGS. 4A-4C, which taken together, illustrate a hybrid instant messaging (IM) protocol, generally referenced 400, for establishing and tracking the transmission of an short message (SM) using the system of FIG. 2C, constructed and operative in accordance with another embodiment of the disclosed technique. Hybrid IM protocol 400 illustrates a sequence of messages exchanged over time between multiple devices and operators of a communication network. Hybrid IM protocol 400 embeds a novel IM protocol for establishing the smart contracts, described above with respect to FIG. 2A, into a standard IM communication protocol, such as the Session Initiation Protocol for Instant Messaging (SIMPLE), commonly used for transmitting text messages, referred to herein as the standard protocol. Messages exchanged relating to the standard IM protocol, are indicated with solid lines with filled arrowheads. Messages relating to the novel IM protocol are indicated with dashed lines and fletched arrowheads. To track protocol 400 to correspond with system 250 of FIG. 2C, the following notation is used: an initiating device 404 corresponds to initiating device 254, a receiving device 406 corresponds to receiving device 256; an originating operator 408 corresponds to originating operator 258, a first transit operator 410 corresponds to transit operator 260, a second transit operator 412 corresponds to transit operator 262, and a terminating operator 414 corresponds to terminating operator 264.

In addition to the standard protocol, hybrid IM protocol 400 additionally includes a novel IM protocol for exchanging messages related to a governing contract 418, a first smart contract 420, a second smart contract 422, and a third smart contract 424. Smart contracts 420, 422, and 424 are transaction protocols executable using distributed ledger technology (DLT), such as distributed ledger 276 (FIG. 2C), to settle the terms agreed to between each consecutive pair of operators along the communication path connecting initiating device 404 to receiving device 406, i.e. first smart contract 420 enforces the terms agreed to between originating operator 408 and first transit operator 410; second smart contract 422 enforces the terms agreed to between first transit operator 410 and second transit operator 412; and third smart contract 424 enforces the terms agreed to between second transit operator 412 and terminating operator 414, respectively.

Governing contract 418 is a transaction protocol executable using DLT, such as distributed ledger 276 that oversees the establishment of each of smart contracts 420, 422, and 424 in a manner to coordinate the establishment of a chain of smart contracts to track the communication path while maintaining anonymity and isolation. Anonymity ensures that each operator of the communication path can only identify the operators immediately neighboring to it, as well as originating operator 408 and terminating operator 414. Isolation ensures that each operator is only aware of the contractual terms it is party to. Governing contract 418 coordinates the establishment of smart contracts 420, 422, and 424 using the novel IM protocol, indicated by dashed lines with open, fletched arrowheads. The novel IM protocol is embedded within the standard protocol, to produce the hybrid IM protocol, which is now described. It is to be noted that the description of the hybrid IM protocol of FIGS. 4A-4C is intended as an exemplary implementation that does no limit the invention to the specific details described herein, but serves as a conceptual description only.

Referring to FIG. 4A, in accordance with the standard IM protocol, initiating device 404 submits a short message (SM) targeted for receiving device 406, to originating operator 408 (Step 430). Before forwarding the SM along the communication path, originating operator 408 first establishes one or more smart contracts, in accordance with the novel IM protocol.

In accordance with the novel IM protocol, originating operator 408 initiates governing contract 418 for governing the smart contracts tracking the communication session between initiating device 404 and receiving device 406, shown in FIG. 4B (Step 432). Governing contract 418 is established via a distributed ledger such as distributed ledger 276 of FIG. 2C. Originating operator 408 initiates first smart contract 420 for tracking the communication channel between originating operator 408 and first transit operator 410 (e.g. channel 268 of FIG. 2C) (Step 434). First smart contract 420 defines the terms agreed to between originating operator 408 and first transit operator 410, such as payment terms, bandwidth allocation, and the like. In some embodiments, first smart contract 420 credits originating operator 408 with at least a portion of a token for subsequently settling payment for the instant message. First smart contract 420 is registered to governing contract 418 via the distributed ledger (Step 436). Originating operator 408 receives a confirmation that first smart contract 420 has been registered with governing contract 418 (Step 438), (e.g. arrow 286_1 of FIG. 2C). On receiving confirmation that first smart contract 420 is successfully registered with governing contract 418, originating operator 408 continues the standard IM protocol.

In accordance with the standard IM protocol, originating operator 408 sends initiating device 404 an acknowledgment (ACK) of the submission of the SM (Step 440). Originating operator 408 forwards the SM to first transit operator 410 (Step 442).

Prior to forwarding the SM along the communication path according to the standard IM protocol, first transit operator 410 requests a confirmation that first smart contract 420 is registered with governing contract 418 (Step 444). First transit operator 410 receives the confirmation that first smart contract 420 is registered with governing contract 418 (Step 446), (e.g. arrow 288_1 of FIG. 2C). Hybrid IM protocol 400 continues on FIG. 4B.

Referring to FIG. 4B, first transit operator 410 initiates second smart contract 422 for governing the communication channel between first transit operator 410 and second transit operator 412 (e.g. channel 270 of FIG. 2C) (Step 448). Second smart contract 422 defines the terms agreed to between first transit operator 410 and second transit operator 412, such as payment terms, bandwidth allocation, and the like. Second smart contract 422 is registered to governing contract 418 via the distributed ledger (Step 450). First transit operator 410 receives a confirmation that second smart contract 422 has been registered with governing contract 418 (Step 452), (e.g. arrow 286_2 of FIG. 2C). On receiving confirmation that second smart contract 422 is successfully registered with governing contract 418, first transit operator 410 continues the standard IM protocol.

In accordance with the standard IM protocol, first transit operator 410 forwards the SM to second transit operator 412 (Step 454). Before the SM can be forwarded further along the communication path, second transit operator 412 must confirm the registration of second smart contract 422 with governing contract 418, and establish third smart contract 424 with the subsequent operator (i.e. terminator 414), according to the novel IM protocol.

In accordance with the novel IM protocol, second transit operator 412 requests a confirmation that second smart contract 422 is registered with governing contract 418 (Step 456). Second transit operator 412 receives the confirmation that second smart contract 422 is registered with governing contract 418 (Step 458), (e.g. arrow 288_2 of FIG. 2C). Second transit operator 412 initiates third smart contract 424 for governing the communication channel between second transit operator 412 and terminating operator 414 (e.g. channel 272 of FIG. 2C) (Step 460). Third smart contract 424 defines the terms agreed to between second transit operator 412 and terminating operator 414, such as payment terms, bandwidth allocation, and the like. Third smart contract 424 is registered to governing contract 418 via the distributed ledger (Step 462). Second transit operator 412 receives a confirmation that third smart contract 424 is registered with governing contract 418 (Step 464), (e.g. arrow 286_3 of FIG. 2C). On receiving confirmation that third smart contract 424 is successfully registered with governing contract 418, second transit operator 412 continues the standard IM protocol.

In accordance with the standard IM protocol, second transit operator 412 forwards the SM to terminating operator 414 (Step 466). However, before the SM can be forwarded further along the communication path, terminating operator 414 first confirms the registration of third smart contract 424, according to the novel IM protocol.

In accordance with the novel IM protocol, terminating operator 414 requests a confirmation that third smart contract 424 has been registered with governing contract 418 (Step 468). Terminating operator 414 receives the confirmation that third smart contract 424 is registered with governing contract 418 (Step 470), (e.g. arrow 288_3 of FIG. 2C), and proceeds with the standard IM protocol for delivering the message.

In some embodiments (not shown), terminating operator 414 requests a verification of the identity of initiating device 404 who originated the call session, and a verification of the identity of originating operator 408, who is providing the guarantee for payment of the call session. The request is implemented via governing contract 418. Terminating operator 414 sends a verification request message to governing contract 418. Governing contract 418 forwards the verification request message to originating operator 408. Originating operator 408 responds to the verification request message by referencing publicly available records. Once identity of the originator of the call session and the identity of originating operator 408 has been confirmed, governing contract 418 sends terminating operator 414 a confirmation to the verification request message. In some embodiments, terminating operator 408 is additionally equipped with a module to receive the verification of the identity of the originating operator 408, and notify receiver 406 about verification status, This may prevent a common and dangerous type of fraud known as "Smishing" or SMS fishing where malicious fraudsters send an SMS impersonating a legitimate sender to extract sensitive information form the receiving party In accordance with the standard IM protocol, terminating operator 414 forwards the SM to receiving device 408 (Step 472). Receiving device 408 sends an acknowledgment of the delivery to terminating operator 414 (Step 474). Hybrid IM protocol 400 continues in FIG. 4C to settle the terms for delivering the SM, in accordance with the novel protocol.

Referring to FIG. 4C, in accordance with the novel IM protocol, terminating operator 414 notifies third smart contract 424 of the delivery of the SM (Step 476). Third smart contract 424 registers the delivery status of the SM with governing contract 418 (Step 478). Governing contract 418 notifies originating operator 408 of the delivery of the SM (Step 480). In some embodiments, initiating device 404 receives a confirmation of the delivery of the SM.

To settle payments, governing contract 418 notifies first smart contract 420 of the cost to transfer the SM (e.g. message size, time, or bandwidth costs for transmitting) in order to settle payment according to the terms of first smart contract 420 (Step 482). First smart contract 420 transfers at least a portion of a token from originating operator 408 to first transit operator 410 according to the terms of first smart contract 420 (Step 484). First smart contract 420 sends governing contract 418 a confirmation of the transfer (Step 486). Governing contract 418 notifies second smart contract 422 of the cost to transfer the SM (e.g. message size, time, or bandwidth costs for transmitting) in order to settle payment according to the terms of second smart contract 422 (Step 488). Second smart contract 422 transfers at least a portion of a token from first transit operator 410 to second transit operator 412 according to the terms of second smart contract 422 (Step 490). Second smart contract 422 sends governing contract 418 a confirmation of the transfer (Step 492). Governing contract 418 notifies third smart contract 424 of the cost to transfer the SM (e.g. message size, time, or bandwidth costs for transmitting) in order to settle payment according to the terms of third smart contract 424 (Step 494). Third smart contract 424 transfers at least a portion of a token from second transit operator 412 to terminating operator 414 according to the terms of third smart contract 424 (Step 496). Third smart contract 424 sends governing contract 418 a confirmation of the transfer (Step 498). Any of first transit operator 410, second transit operator 412 and terminating operator 414 may request originating operator 408 to redeem their respective tokens or portions thereof for fiat currency.

Figure 5:
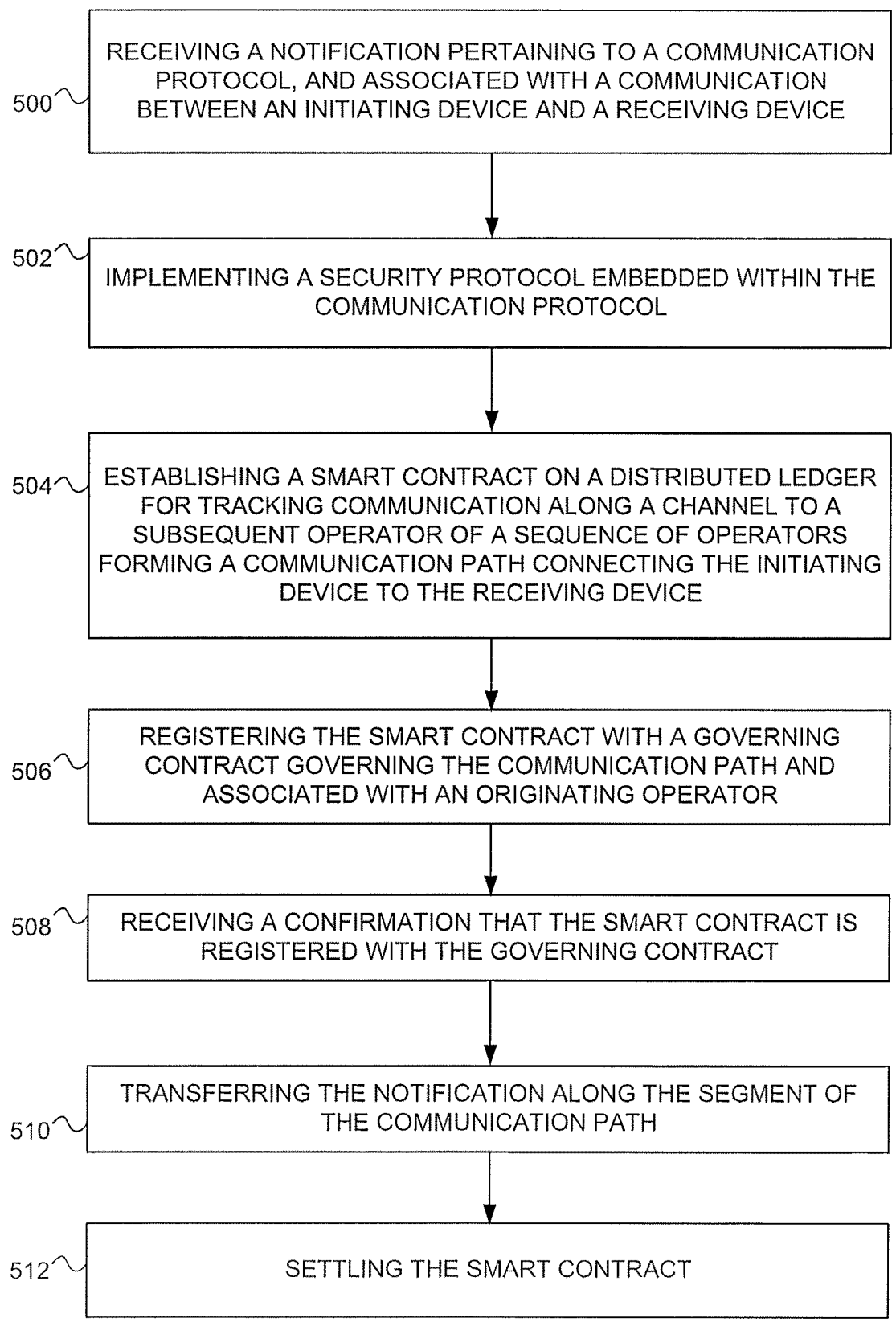
FIG. 5 is a flowchart of a method for tracking the transfer of a message, constructed and operative in accordance with a further embodiment of the disclosed technique.

Reference is now made to FIG. 5 which is a flowchart of a method for tracking the transfer of a notification, constructed and operative in accordance with a further embodiment of the disclosed technique.

A notification pertaining to a communication protocol and associated with a communication between an initiating device and a receiving device is received (Procedure 500). With reference to FIG. 3A, in Step 340 transit operator 310 (corresponding to operator 260 of FIG. 2C) receives a Call invite notification from originating operator 308 (corresponding to originating operator 258 of FIG. 2C). The Call invite notification pertains to a call protocol and is associated with communication between initiating device 302 and receiving device 306 (FIG. 3C, and corresponding to device 256 of FIG. 2C).

A security protocol embedded within the communication protocol, is implemented (Procedure 502). The security protocol may be implemented by performing one or more of Procedures 504-508. With reference to FIGS. 3A-3D, the security protocol, indicated with dashed lines and fletched arrowheads (e.g. Steps 332-338 in FIG. 3A) is embedded within a conventional call protocol indicated with solid lines and filled arrowheads (e.g. Steps 330 and 340). Similarly, with reference to FIGS. 4A-4C, the security protocol, indicated with dashed lines and fletched arrows (e.g. Steps 432-438 of FIG. 4A), is embedded within a conventional messaging protocol indicated with solid lines and filled arrowheads (steps 430, 440, and 442).

A smart contract is established on a distributed ledger for tracking communication along a channel connecting to a subsequent operator of a sequence of operators that connect the initiating device to the receiving device (Procedure 504). The sequence of operators forms a communication path, and the channel is at least a segment of the communication path. With reference to FIG. 2C, transit operator 260 establishes smart contract 282 on distributed ledger 276, to govern channel 270 connecting transit operator 260 with transit operator 262. Transit operators 260 and 262 are adjacent operators of the sequence of operators 258, 260, 262, and 264 that form communication path 252 connecting initiating device 254 with receiving device 256, with channel 270 being a segment thereof.

In some embodiments, prior to establishing the smart contract in Procedure 504, a confirmation of a registration of a preceding smart contract governing a preceding channel is received. In this case, the notification of Procedure 500 was received via the preceding channel. In some embodiments, establishing the smart contract of Procedure 504 is conditional on receiving the confirmation for the preceding smart contract. With reference to FIG. 2C, prior to establishing smart contract 282 for governing channel 270, transit operator 260 receives a confirmation (arrow 288_1) that the preceding smart contract 280, governing preceding channel 268 over which the notification was received, has been registered with governing contract 278. Transit operator 260 conditions the establishing of smart contract 282 for subsequent channel 270 on receiving the confirmation, with respect to preceding channel 268.

The smart contract is registered with a governing contract associated with an originating operator of said sequence of operators (Procedure 506). The originating operator is in communication with the initiating device over a local channel, and the governing contract is implemented on the distributed ledger. The governing contract governs communication along the communication path. With reference to FIGS. 2C, smart contract 282 is registered with governing contract 278 implemented on distributed ledger 276. Governing contract 278 is associated with originating operator 258, which communicates with initiating device 254 over local channel 266. Governing contract 278 governs communication along communication path 252.

In some embodiment, the method further includes establishing the governing contract. With reference to FIG. 2C, originating operator 258 initiates the establishment of governing contract 278 on distributed ledger 276.

A confirmation is received that the smart contract is registered (Procedure 508). With reference to FIG. 2C, transit operator 260 receives a confirmation that smart contract 282 is registered with governing contract 278, in association with originating operator 258.

In some embodiments, the smart contract is registered with the governing contract according to a cryptographic protocol that ensures confidentiality and anonymity with respect to other operators of the communication path that are not party to the smart contract. With reference to FIG. 2C, smart contract 280 is registered with governing contract 278 according to a cryptographic protocol that ensures confidentiality and anonymity with respect to the other operators of communication path 252, e.g. transit operator 262 and terminator 264.

The notification is transferred to the subsequent operator along the at least segment of the communication path in response to receiving the confirmation (Procedure 510). With reference to FIG. 2C, transit operator 260 transfers the notification to transit operator 262 along channel 270 in response to receiving the confirmation (arrow 286_2) that smart contract 282 has been registered with governing contract 278. With reference to FIG. 3B, in Step 354, transit operator 310 sends the Call (Invite) notification to transit operator 312 in response to receiving a confirmation that smart contract 322 has been registered (step 352).

The smart contract is settled. In some embodiments, the smart contract is settled by crediting with at least a portion of a token allocated for the communication path by the governing contract (Procedure 512). The allocation is implemented according to a cryptographic protocol of the distributed ledger. With respect to FIG. 3D, in step 390, transit operator 310 receives a payment via smart contract 320 using at least a portion of a token allocated for communication path 252 (FIG. 2C) by governing contract 318, in accordance with cryptographic protocols of distributed ledger technology.

In some embodiments, implementing the security protocol further includes verifying any of the originating operator, a terminating operator communicating with the receiving device over a local channel, the initiating device, and the receiving device. With reference to FIG. 2C, transit operator 260 verifies the identity of originating operator 258, which communicates with initiating device 254 over local channel 266, and additionally verifies the identity of terminating operator 264, which communicates with receiving device 256 over local channel 274. Similarly, transit operator 260 verifies the identity of initiating device 254 and/or of receiving device 256.

In some embodiments, the communication protocol is a call protocol. The notification may be, for example, an invitation to establish a communications session, such as a telephone, voice, or video call. The governing contract tracks the call established via the call protocol between the initiating device and the receiving device. With reference to FIGS. 3A-3D, the communication protocol is a call protocol indicated with solid lines and filled arrowheads. The disclosed technique embeds a security protocol, indicated with dashed lines and fletched arrowheads, into the call protocol to create a hybrid protocol.

In another embodiment, the communication protocol is a messaging protocol. The notification may be, for example, a short message. The governing contract tracks the transmission of a short message via the instant messaging protocol from the initiating device to the receiving device. With reference to FIGS. 4A-4C, the communication protocol is a messaging protocol indicated with solid lines and filled arrowheads. The disclosed technique embeds a security protocol, indicated with dashed lines and fletched arrowheads, into the messaging protocol to create a hybrid protocol.

Figure 6:
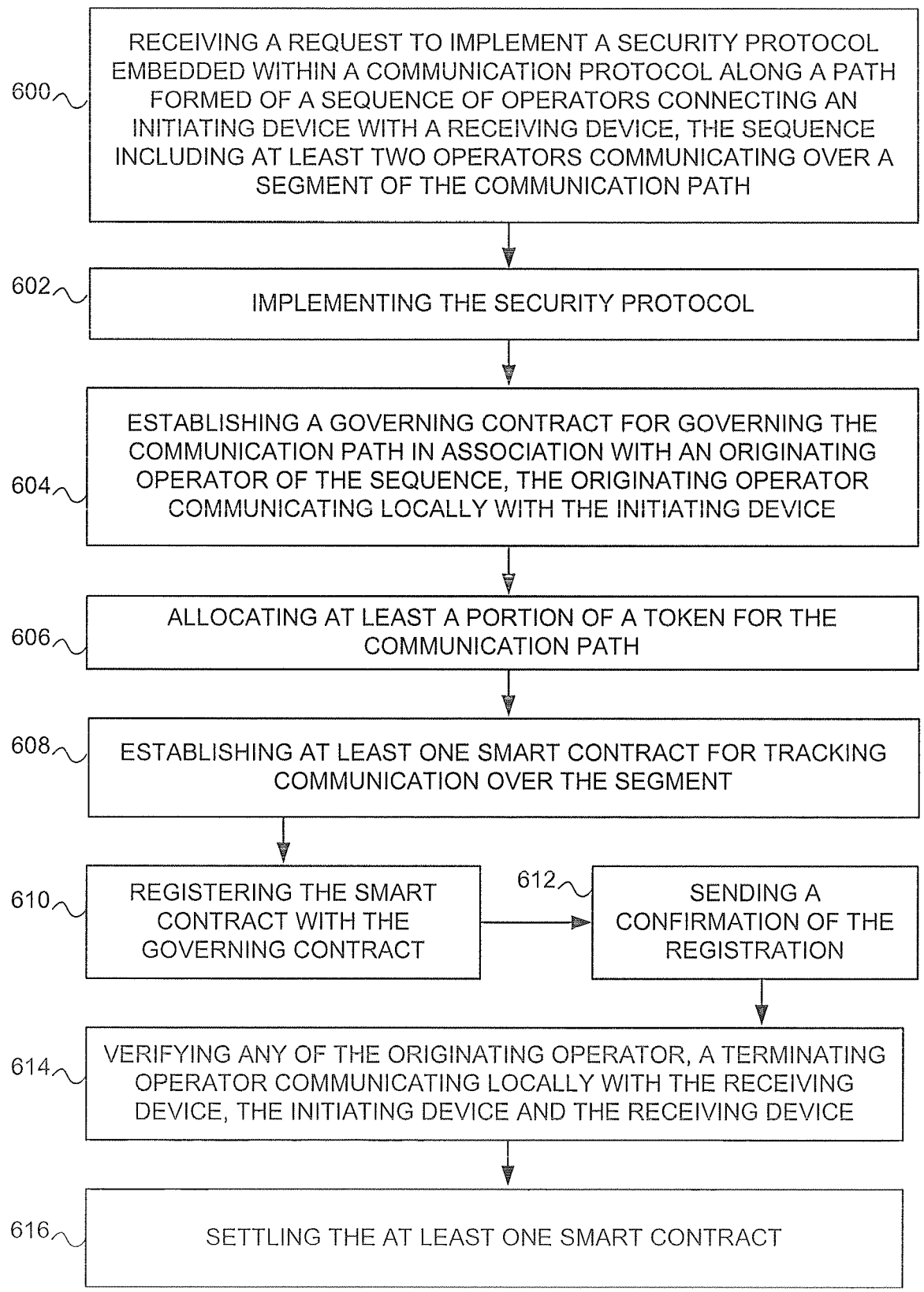
FIG. 6 is flowchart of another method for tracking the transfer of a message, constructed and operative in accordance with another embodiment of the disclosed technique.

Reference is now made to FIG. 6 which is a flowchart of a method for tracking the transfer of a notification via a distributed ledger, constructed and operative in accordance with another embodiment of the disclosed technique.

A request to implement a security protocol embedded within a communication protocol is received (Procedure 600). The security protocol is configured to track communication pertaining to the communication protocol along a communication path formed from a sequence of operators connecting an initiating device with a receiving device, and includes at least a first operator and a subsequent operator communicating over a channel forming at least a segment of said communication path. With reference to FIG. 3A, in step 332, originating operator 308 sends a request to the distributed ledger to initiate governing contract 318 as part of a security protocol (dashed arrows) embedded within a communication protocol (solid arrows). With reference to FIG. 2C, the security protocol tracks communication pertaining to a communication protocol implemented along communication path 252 formed from the sequence of operators 258, 260, 262, and 264 that connect initiating device 254 with receiving device 256. Communication path 252 includes at least originating operator 258 and transit operator 260 communicating over channel 268 forming a segment of communication path 252.

The security protocol is implemented (Procedure 602). The security protocol may be implemented by performing one or more of Procedures 604-616. With reference to FIGS. 3A-3D, 4A-4C, and 7A-7C, the security protocol is indicated with dashed arrows, and is embedded within the communication protocol indicated with solid arrows.

A governing contract for governing communication along the communication path is established on the distributed ledger (Procedure 604). The governing contract is associated with an originating operator of the sequence of operators that communicates with the receiving device over a local channel. With reference to FIG. 3A, in step 332, originator 308 initiates the establishment of governing contract 318. In FIG. 2C, originating operator 258 communicates with receiving device 254 over local channel 266.

At least a portion of a token is allocated for the communication path according to a cryptographic protocol of the distributed ledger, as part of the security protocol (Procedure 606). With reference to FIG. 2C, governing contract 278 allocates at least a portion of one cryptographic token of distributed ledger 276.

At least one smart contract for tracking communication over the segment of the communication path is established (Procedure 608). With reference to FIG. 2C, originating operator 258 initiates the establishment of smart contract 280 on distributed ledger 278. With reference to FIG. 3A, in step 332 originating operator 308 258 initiates the establishment of smart contract 320.

The smart contract is registered with the governing contract (Procedure 610). With reference to FIG. 3A, in step 336, smart contract 320 is registered with governing contract 318.

A confirmation of the registration is sent (Procedure 612). In some embodiments, forwarding the notification by the first operator to the subsequent operator is conditional on the first operator receiving the confirmation. With reference to FIG. 3A, in step 338, originating operator 30 receives a confirmation that smart contract 320 is registered with governing contract 318. In some embodiments, forwarding the Call (Invite) notification to transit operator 310 in step 340 is conditional on receiving the confirmation of step 338.

Any one of the originating operator, a terminating operator communicating with the receiving device over a local channel, the initiating device and the receiving device is verified (Procedure 614). With reference to FIG. 2C, at least one of transit operators 260 and 262 verify at least one of originating operator 258, terminating operator 264, initiating device 254 and receiving device 256.

The at least one smart contract is settled. In some embodiments, the smart contract is settled by distributing at least portion of a token allocated for the communication path (Procedure 616). With reference to FIG. 3D, governing contract 318 distributes the at least portion of the token to transit operator 310 via smart contract 320, in steps 388 and 390.

Figure 7A:
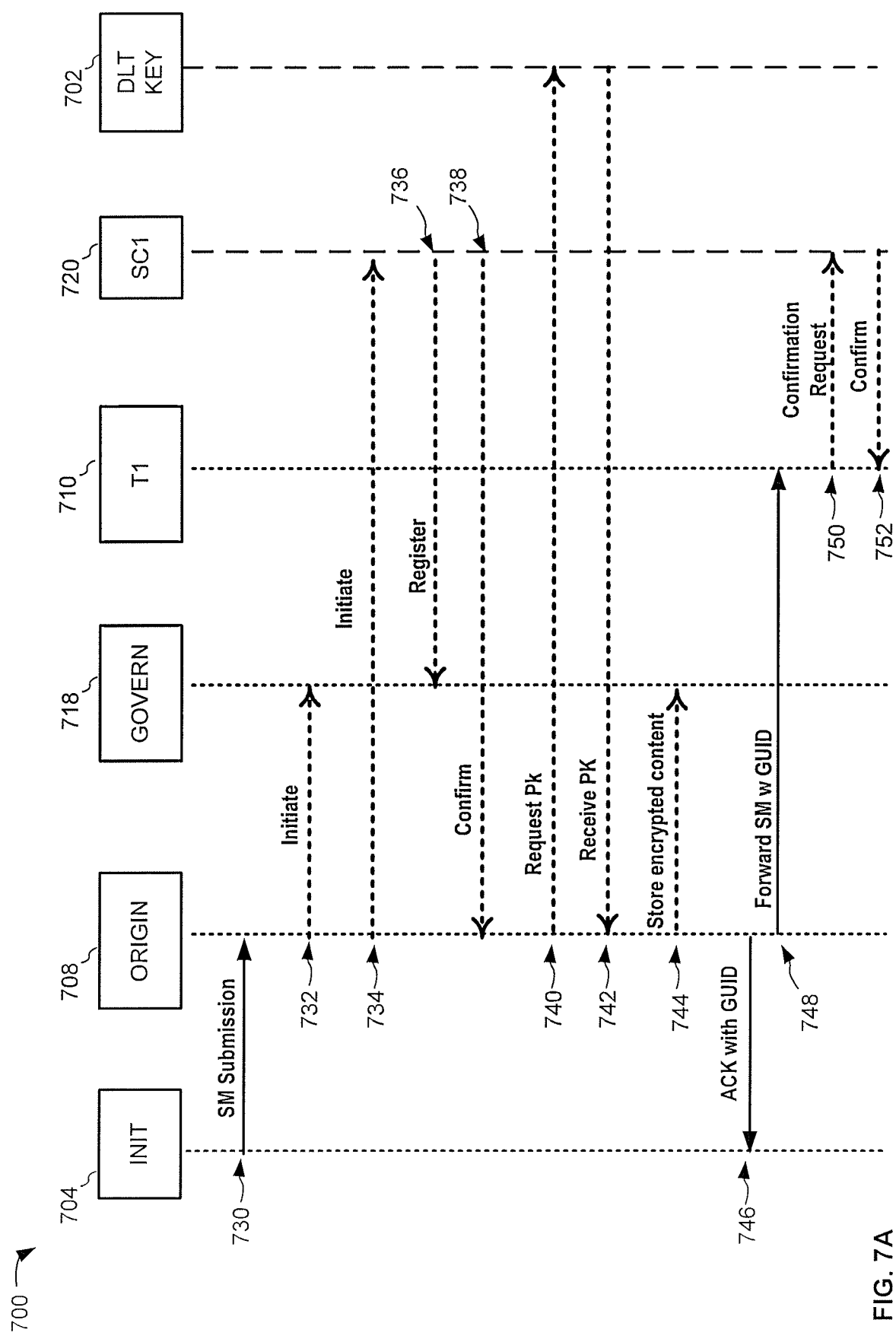
FIGS. 7A-7C, taken together, illustrate a hybrid instant messaging protocol for establishing and tracking the transmission of a pointer to an encrypted message, constructed and operative in accordance with a further embodiment of the disclosed technique.
Figure 7B:
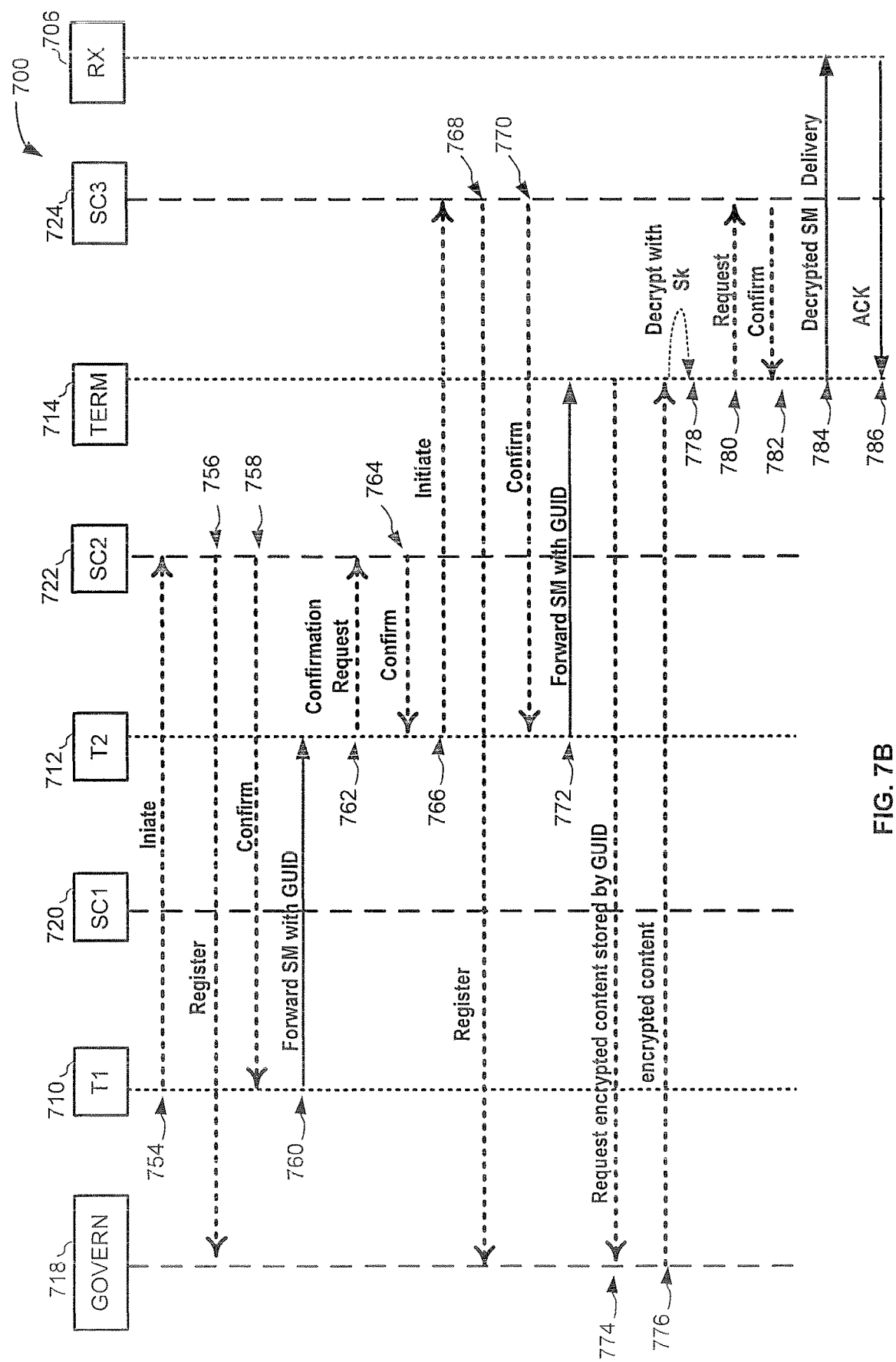
Figure 7C:
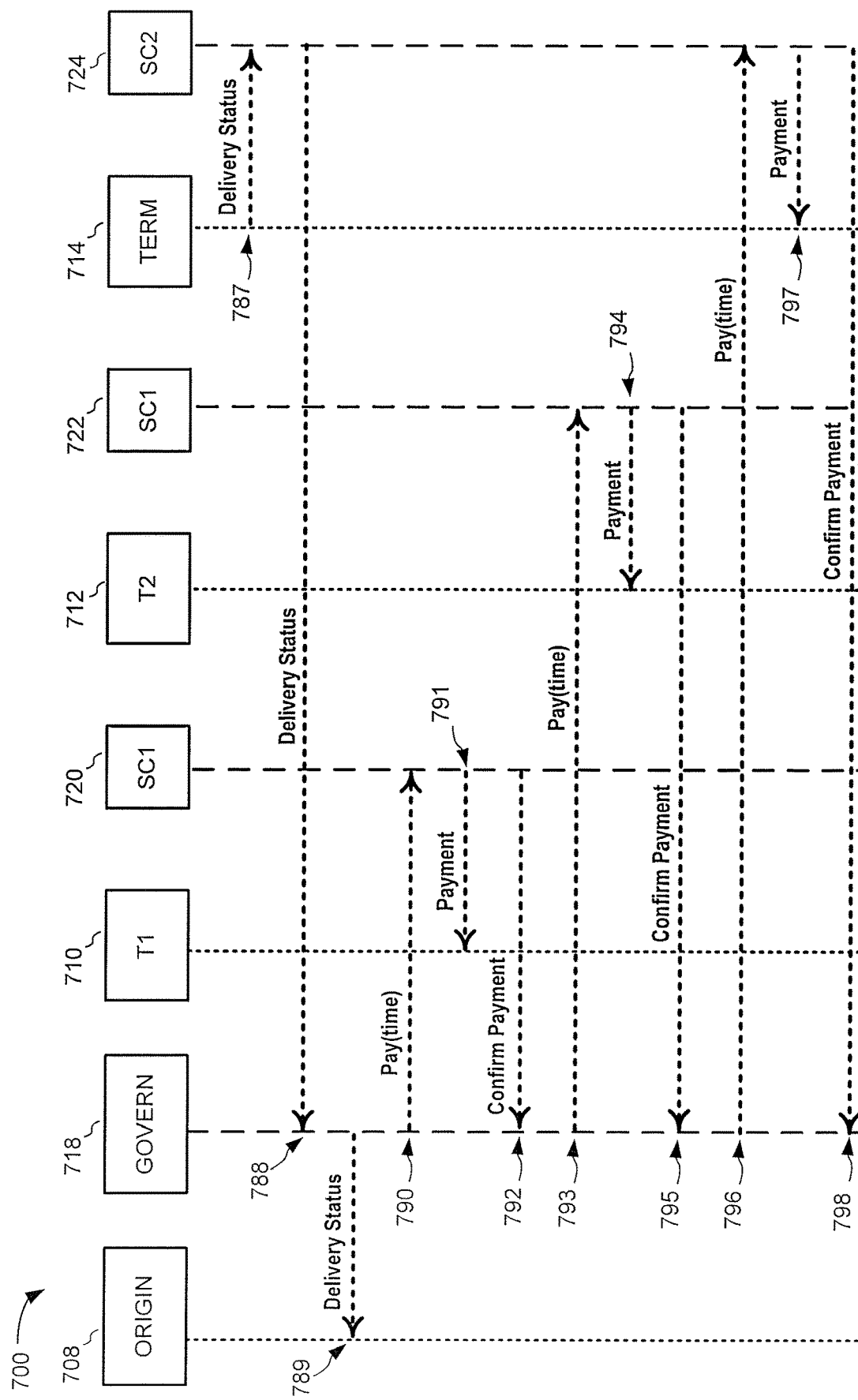

Reference is now made to FIGS. 7A-7C, which taken together, illustrate a hybrid instant messaging protocol, generally referenced 700, for establishing and tracking the transmission of a pointer to an encrypted message, constructed and operative in accordance with a further embodiment of the disclosed technique. Protocol 700 is substantially similar to protocol 400 of FIGS. 4A-4C with the notable difference that of ensuring that only the originating and terminating operators can access the plaintext content of the message. To achieve this, the originating operator (e.g. originating operator 258 of FIG. 2C) encrypts the message content with an encryption key and stores the encrypted message for subsequent retrieval via a global unique identifier (GUID). For example, the encrypted message may be stored on the distributed ledger via the governing contract. Instead of sending the plaintext message over the communication path, as described by protocol 400 of FIGS. 4A-4C, the originating operator replaces the plaintext message content with the GUID, and transmits the GUID instead. The GUID is transmitted over the communication path in accordance with the hybrid protocol of FIGS. 4A-4C, i.e. by establishing a smart contract registered with the governing contract for each path segment connecting each pair of operators. When the terminating operator (e.g. operator 264 of FIG. 2C) receives the GUID in the message body, the terminating operator uses the GUID to retrieve the encrypted message from the distributed ledger. The terminating operator decrypts the retrieved message and delivers the original plaintext message to the receiving device (e.g. device 256). In this manner, only the originating and terminating operators can access to the message content. The intermediate operators along the communication path can only access the GUID, which points to encrypted content.

In some embodiments, the public key infrastructure (PKI) implemented by the distributed ledger is used to encrypt the message. For example, the originating operator retrieves the public key (PK) of the terminating operator from a key repository of the distributed ledger and encrypts the message with the PK. When the terminating operator subsequently retrieves the encrypted message using the GUID, the terminating operator decrypts the message with the corresponding private key (SK). The protocol is now described in greater detail.

Similar to protocol 400 of FIGS. 4A-4C, notifications pertaining to a conventional messaging protocol are indicated with solid lines and filled arrowheads. Notifications pertaining to the novel security protocol, embedded within the conventional protocol are indicated with dashed lines and fletched arrows. Similarly, to correspond to system 250 of FIG. 2C, an initiating device 704, a receiving device 706, an originating operator 708, a first transit operator 710, a second transit operator 712, and a terminating operator 714, correspond to initiating device 254, receiving device 256, originating operator 258, transit operator 260, transit operator 262, and terminating operator 264, respectively. Operators 708, 710, 712 and 714 form the communication path. Governing contract 718, first smart contract (SC1) 720, second smart contract (SC2) 722, third smart contract (SC3) 724 correspond to governing contract 278, smart contract 280, smart contract 282, and smart contract 284, respectively. Protocol 700 additionally includes a key repository 702 configured with distributed ledger 276. Key repository 702 stores and distributes public keys in accordance with conventional public key infrastructure (PKI) methods.

Referring to FIG. 7A, in accordance with the standard IM protocol, initiating device 704 submits a short message (SM) targeted for receiving device 706, to originating operator 708 (Step 730). Before forwarding the SM along the communication path, originating operator 708 establishes first smart contract 420 with the next operator, according to the novel IM protocol.

In accordance with the novel IM protocol, originating operator 708 initiates governing contract 718 for governing the communication session between initiating device 704 and receiving device 706, shown in FIG. 7B (Step 732). Governing contract 718 is established via distributed ledger 276 of FIG. 2C. Originating operator 708 initiates SC1 720 for tracking the communication channel to first transit operator 710 (e.g. channel 268 of FIG. 2C) (Step 734). SC1 720 may define payment, bandwidth, and the like. In some embodiments, SC1 720 credits originating operator 708 with one or more tokens for subsequently settling payment. SC1 720 is registered with governing contract 718 (Step 736). Originating operator 708 receives a confirmation that SC1 720 is registered with governing contract 718 (Step 738), (e.g. arrow 286_1 of FIG. 2C). On receiving the confirmation, originating operator 708 requests the PK for terminating operator 714 from key depository 702 (Step 740), and receives the PK (Step 742). Originating operator 708 encrypts the message content with the PK and stores the encrypted content, for example on the distributed ledger via governing contract 718 (Step 744). Originating operator 708 obtains a GUID for subsequently accessing the encrypted message from the distributed ledger.

In accordance with the standard IM protocol, originating operator 708 sends initiating device 704 an acknowledgment (ACK) that the GUID for the encrypted SM has been submitted (Step 746). Originating operator 708 forwards the GUID for the encrypted SM to first transit operator 710 (Step 748). Hybrid protocol 700 continues in accordance with hybrid protocol 400, with the noted different that the GUID for the encrypted SM has replaced the message content, and is now transmitted along the communication path instead of the original, plaintext message.

Referring to FIG. 7B, the GUID for the encrypted message is now transferred from transport operator 710 to transport operator 712 in Step 760, and from transport operator 712 to terminating operator in Step 772. Terminating operator 714 extracts the GUID from the message body and uses it to request the encrypted message content from the distributed ledger via governing contract 718 (Step 774). Terminating operator 714 retrieves the encrypted message content via governing contract 718 (Step 776), and decrypts the message with the SK corresponding to the PK of Steps 740-742, and known only to terminating operator 714. The message is delivered to the receiving device 706 (Step 784), and receiving device 706 sends terminating operator 714 an ACK on successful delivery (Step 786). Referring to FIG. 7C, payment is settled in a manner similar to that described above with respect to protocol 400 of FIG. 4C.

In this manner, rather than transmit the plaintext message to any number of operators forming the communication path, the GUID to the encrypted message is sent instead, such that only originating operator 708 and terminating operator 714 can access the plaintext message content. This protects the message content from being exposed to the intermediate operators along the communication path which may not be as trustworthy as originating operator 708 and terminating operator 714.

Figure 8:
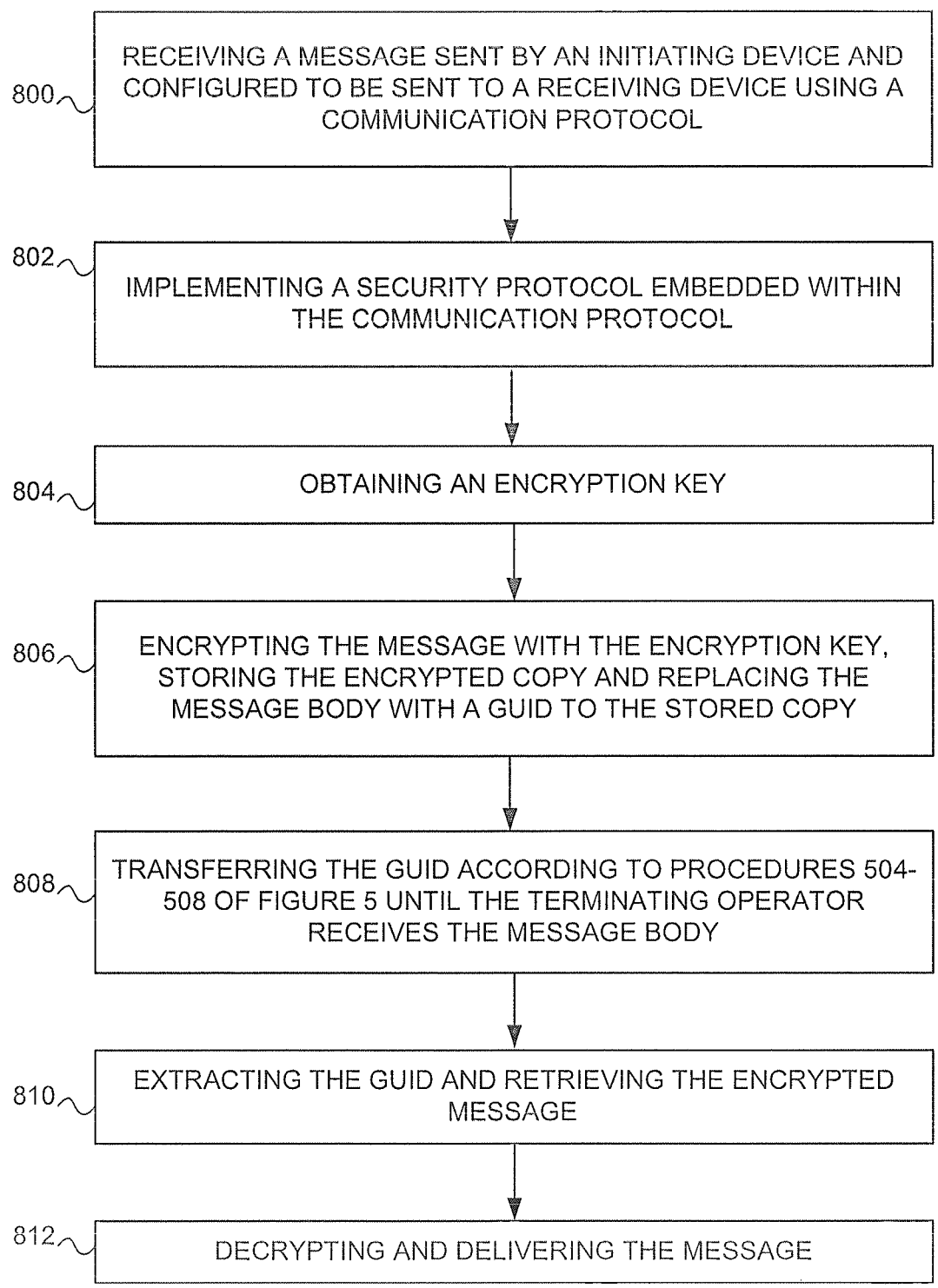
FIG. 8 is a flowchart of a method for tracking the transfer of a pointer to an encrypted message, constructed and operative in accordance with another embodiment of the disclosed technique.

Reference is now made to FIG. 8 which is a flowchart of a method for tracking the transfer of a pointer to an encrypted message, constructed and operative in accordance with another embodiment of the disclosed technique. Method 800 corresponds to protocol 700 of FIGS. 7A-7C, and is therefore similar to the of FIG. 5 with the notable difference that the original message body is replaced with a GUID pointing to an encrypted copy of the original plaintext message for subsequent retrieval by authorized parties only.

A message sent by an initiating device and configured to be sent to a receiving device over a communication path via a messaging protocol, is received (Procedure 800). With reference to FIG. 7A, in Step 730 originating operator 708 (operator 258 of FIG. 2C) receives a short message from initiating device 704 (254 of FIG. 2C).

A security protocol embedded within the communication protocol is implemented (Procedure 802). With reference to FIGS. 7A-7C, the security protocol is indicated with dashed lines and fletched arrowheads and is embedded within a conventional call protocol indicated with solid lines and filled arrowheads.

An encryption key is obtained (Procedure 804). With reference to FIG. 7A, in step 740, originating operator 708 requests the public key of terminating operator 714 from key depository 702 of the distributed ledger. In step 742, originating operator 708 receives the key from key depository 702.

The message is encrypted with the encryption key to produce an encrypted copy and stored, and a GUID pointing to the encrypted copy is inserted into the message body as a replacement (Procedure 806). With reference to FIG. 7A, originating operator encrypts the message to produce an encrypted copy, and stores the encrypted copy at the distributed ledger via governing contract 718 (Step 744). The message is replaced with the GUID.

The message is transmitted according to Procedures 504-508, until the terminating operator receives the message (Procedure 808). Referring to FIG. 7B, terminating operator 714 receives the message in step.

The GUID is extracted from the message body and used to retrieve the encrypted copy of the message from storage (Procedure 810). With reference to FIG. 7B, terminating operator 714 extracts the GUID from the message body and uses the GUID to retrieve the encrypted copy of the message from the distributed ledger via governing contract 718 in step 774.

The encrypted copy of the message is decrypted delivered to the receiving device (Procedure 812). With reference to FIG. 7B, in Step 778 terminating operator 714 decrypts the message using the private key corresponding to the public key used in Procedure 806. In step 784 terminating operator 714 delivers the decrypted message to receiving device 706.

In some embodiments, the security protocol may additionally include performing one or more of Procedures 502-512 of FIG. 5, e.g. by establishing and registering one or more smart contracts with a governing contract (Procedures 504-506), optionally conditioning the transferal of notifications along the communication path on receiving a confirmation of the registration (Procedures 508-510), and settling the terms of the smart contract when the communication session terminates (Procedure 512).

It will be appreciated by persons skilled in the art that the disclosed technique is not limited to what has been particularly shown and described hereinabove. Rather the scope of the disclosed technique is defined only by the claims, which follow.

What is claimed is:

1. A method for tracking communication between at least one of an initiating device and an initiating operator, with corresponding at least of a receiving device and a terminating operator, in which the initiating device is enabled for communication with the imitating operator, and the receiving device is enabled for communication with the terminating operator, the method comprising:
- receiving, by said at least one of said initiating device and said initiating operator, a notification pertaining to a communication protocol, said notification includes a message having a message body, said message is sent from said initiating device destined to said receiving device;
- implementing a security protocol embedded within said communication protocol, said security protocol comprising:
  - establishing, on a distributed ledger, a smart contract for tracking communication along a channel to a subsequent operator of a sequence of operators forming a communication path between said initiating device and said receiving device, wherein said channel is at least a segment of said communication path;
  - registering said smart contract with a governing contract associated with an originating operator of said sequence of operators, wherein said originating operator is in communication with said initiating device over a first local channel, and wherein said governing contract is implemented on said distributed ledger and is configured to govern communication along said communication path;
  - encrypting said message to produce an encrypted copy;
  - replacing said message body with an identifier pointing to said encrypting copy; and
  - storing said encrypted copy at said distributed leger via said governing contract, and
- transferring said notification to said subsequent operator along said at least a segment of said communication path toward said terminating operator.

2. The method of claim 1, wherein implementing said security protocol further comprises receiving a confirmation of said registering said smart contract with said governing contract, wherein said transferring said notification to said subsequent operator along said channel is conditional on receiving said confirmation.

3. The method of claim 1, wherein implementing said security protocol further comprises registering said smart contract with said governing contract according to a cryptographic protocol that ensures confidentiality and anonymity with respect to a third operator of said sequence of operators forming said communication path between said initiating device and said receiving device.

4. The method of claim 1, wherein implementing said security protocol further comprises establishing said governing contract on said distributed ledger.

5. The method of claim 1, wherein implementing said security protocol further comprises verifying a device selected from the group consisting of: said originating operator, a terminating operator of said sequence of operators in communication with said receiving device over a second local channel, said initiating device and said receiving device.

6. The method of claim 1, wherein implementing said security protocol further comprises receiving a confirmation of a registration of a preceding smart contract tracking a preceding channel with said governing contract, wherein said notification is received via said preceding channel.

7. The method of claim 1, wherein said communication protocol is a call protocol for establishing a call between said initiating device and said receiving device, wherein implementing said security protocol tracks said call over said channel.

8. The method of claim 1, wherein said communication protocol is a messaging protocol, wherein implementing said security protocol tracks a transmission of said notification over said channel.

9. The method of claim 8, wherein said message is a short message sent from said initiating device to said receiving device.

10. The method of claim 9, wherein said identifier is a global unique identifier (GUID) implementing said security protocol tracks a transmission of said GUID over said channel.

11. The method of claim 8 wherein said notification is a global unique identifier (GUID) pointing to an encrypted copy of a short message sent from said initiating device to said receiving device, the method further comprising retrieving said encrypted copy with said GUID, decrypting said encrypted copy to recover said short message, and delivering said short message to said receiving device.

12. The method of claim 1, further comprising settling said smart contract.

13. The method of claim 12, wherein said settling said smart contract comprises receiving at least a portion of a token allocated for said communication path by said governing contract according to a cryptographic protocol of said distributed ledger.

14. A system for tracking communication, the system comprising:
- a first operator of a sequence of operators forming a communication path between an initiating device and a receiving device, said receiving device is enabled for communication with said first operator, said receiving device is enabled for communication to a termination operator,
- a channel coupling said first operator with a subsequent operator of said sequence of operators, wherein said channel forms at least a segment of said communication path; and
- a distributed ledger configured to communicate with each operator of said sequence of operators via a network, wherein said first operator is configured to:
  - receive a notification pertaining to a communication protocol, said notification includes a message having a message body, said notification associated with a communication between said initiating device and said receiving device,
  - implement a security protocol embedded within said communication protocol, said security protocol comprising:
    - establishing, on said distributed ledger, a smart contract for tracking communication along said channel to said subsequent operator;
    - registering said smart contract with a governing contract associated with an originating operator of said sequence of operators, wherein said originating operator is in communication with said initiating device over a first local channel, and wherein said governing contract is implemented on said distributed ledger and is configured to govern communication along said communication path;
    - encrypting said message to produce an encrypted copy;
    - replacing said message body with a global unique identifier (GUID) pointing to said encrypted copy; and
    - storing said encrypted copy at said distributed ledger via said governing contract, and transferring said notification to said subsequent operator along said at least a segment of said communication path toward said ter thing operator.

15. The system of claim 14, wherein implementing said security protocol further comprises receiving a confirmation of said registering said smart contract with said governing contract, wherein said transferring said notification to said subsequent operator is conditional on receiving said confirmation.

16. The system of claim 14, wherein implementing said security protocol further comprises registering said smart contract with said governing contract according to a cryptographic protocol that ensures confidentiality and anonymity with respect to any other operator of said sequence of operators forming said communication path between said initiating device and said receiving device.

17. The system of claim 14, wherein said first operator is said originating operator, wherein implementing said security protocol further comprises establishing said governing smart contract on said distributed ledger.

18. The system of claim 14, wherein implementing said security protocol further comprises verifying a device selected from the group consisting of: said originating operator, a terminating operator of said sequence of operators in communication with said receiving device over a second local channel, said initiating device, and said receiving device.

19. The system of claim 14, wherein implementing said security protocol further comprises receiving a confirmation of a registration of a preceding smart contract governing a preceding channel, wherein said first operator receives said notification via said preceding channel.

20. The system of claim 14, wherein said communication protocol is a call protocol for establishing a call between said initiating device and said receiving device, wherein implementing said security protocol tracks said call over said channel.

21. The system of claim 14, wherein said communication protocol is a messaging protocol, wherein implementing said security protocol tracks a transmission of said notification over said channel.

22. The system of claim 21, wherein said message is a short message sent from said initiating device to said receiving device.

23. The system of claim 22, wherein said identifier is a global unique identifier (GUID), wherein implementing said security protocol tracks a transmission of said GUID over said channel.

24. The system of claim 21, wherein said notification is a global unique identifier (GUID) pointing to an encrypted copy of a short message sent from said initiating device to said receiving device, wherein said first operator is further configured to retrieve said encrypted copy with said GUID, decrypt said encrypted copy to recover said short message, and deliver said short message to said receiving device.

25. The system of claim 14, wherein said first operator is further configured to settle said smart contract.

26. The system of claim 25, wherein said settling said smart contract comprises receiving a credit for at least a portion of a token allocated for said communication path by said governing contract according to a cryptographic protocol of said distributed ledger.

27. A method for tracking communication on a distributed ledger, the method comprising:
receiving a request to implement a security protocol embedded within a communication protocol that included a messaging protocol, wherein said security protocol is configured to track communication pertaining to said communication protocol along a communication path formed from a sequence of operators connecting an initiating device with a receiving device, said sequence comprising at least a first operator and a subsequent operator communicating over a channel forming at least a segment of said communication path; and implementing said security protocol that tracks a transmission of a notification over said communication path, said notification includes a message having a message body, by:
establishing a governing contract for governing communication along said communication path, said governing contract associated with an originating operator of said sequence of operators, wherein said originating operator is in communication with said initiating device over a first local channel;
establishing a smart contract for tracking communication along said at least a segment of said communication path;
registering said smart contract with said governing contract;
encrypting said message to produce an encrypted copy; and
storing said encrypted copy of said message and providing an identifier pointing to said encrypted copy, wherein said security protocol tracks transmission of said identifier over said communication path.

28. The method of claim 27, wherein implementing said security protocol further comprises sending a confirmation of said registering said at least one smart contract with said governing contract, wherein said transferring a notification pertaining to said communication protocol to said subsequent operator along said channel is conditional on said confirmation.

29. The method of claim 27, wherein implementing said security protocol further comprises sending a second confirmation of said registering said at least one smart contract with said governing contract to said subsequent operator.

30. The method of claim 27, wherein implementing said security protocol further comprises registering said smart contract with said governing contract according to a cryptographic protocol that ensures confidentiality and anonymity with respect to a third operator of said sequence of operators forming said communication path between said initiating device and said receiving device.

31. The method of claim 27, wherein implementing said security protocol further comprises allocating at least a portion of a token for said communication path according to a cryptographic protocol of said distributed ledger.

32. The method of claim 31, wherein implementing said security protocol further comprises settling said at least one smart contract.

33. The method of claim 32, wherein settling said at least one smart contract comprises distributing at least a portion of a token allocated for said communication path.

34. The method of claim 27, wherein implementing said security protocol further comprises verifying a device selected from the group consisting of: said originating operator, a terminating operator of said sequence of operators in communication with said receiving device over a second local channel, said initiating device, and said receiving device.

35. The method of claim 27, wherein said communication protocol is a call protocol, wherein said security protocol tracks a call established between said initiating device and said receiving device via said call protocol.

36. The method of claim 27, wherein said security protocol tracks a transmission of a notification over said communication path.

37. The method of claim 36, wherein said notification is a short message sent from said initiating device to said receiving device.

38. The method of claim 37, wherein said identifier is a global unique identifier (GUID) pointing to said encrypted copy.

39. A system for tracking communication, the system comprising:
   a distributed ledger implemented over a network of multiple computers; and
   a network connecting said distributed ledger with each operator of a sequence of operators forming a communication path, said communication path configured to connect an initiating device with a receiving device via a communication protocol that includes a messaging protocol, and comprising at least a first operator and a subsequent operator communicating over a channel forming at least a segment of said communication path,
   wherein said distributed ledger is configured to:
   receive a request to implement a security protocol embedded within said communication protocol, wherein said security protocol is configured to track communication pertaining to said communication protocol along said communication path; and
   implement said security protocol that tracks a transmission of a notification over said communication path, said notification includes a message having a message body by:
      establishing a governing contract for governing communication along said communication path, said governing contract associated with an originating operator of said sequence of operators, wherein said originating operator is in communication with said initiating device over a first local channel,
      establishing a smart contract for tracking communication along said at least a segment of said communication path,
      registering said smart contract with said governing contract;
      encrypting said message to produce an encrypted copy; and
      storing said encrypted copy of said message and providing an identifier pointing to said encrypted copy,
      wherein said security protocol tracks transmission of said identifier over said communication path.

40. The system of claim 39, wherein implementing said security protocol further comprises sending a confirmation of said registering said at least one smart contract with said governing contract, wherein said transferring a notification pertaining to said communication protocol to said subsequent operator along said channel is conditional on receiving said confirmation.

41. The system of claim 39, wherein implementing said security protocol further comprises sending a second confirmation of said registering said at least one smart contract with said governing contract to said subsequent operator.

42. The system of claim 39, wherein implementing said security protocol further comprises registering said smart contract with said governing contract according to a cryptographic protocol that ensures confidentiality and anonymity with respect to a third operator of said sequence of operators forming said communication path between said initiating device and said receiving device.

43. The system of claim 39, wherein implementing said security protocol further comprises allocating at least a portion of a token for said communication path according to a cryptographic protocol of said distributed ledger.

44. The system of claim 43, wherein implementing said security protocol further comprises settling said at least one smart contract.

45. The system of claim 44, wherein settling said at least one smart contract comprises distributing at least a portion of a token allocated for said communication path.

46. The system of claim 39, wherein implementing said security protocol further comprises verifying a device selected from the group consisting of: said originating operator, a terminating operator of said sequence of operators in communication with said receiving device over a second local channel, said initiating device, and said receiving device.

47. The system of claim 39, wherein said communication protocol is a call protocol, wherein said security protocol tracks a call established between said initiating device and said receiving device via said call protocol.

48. The system of claim 39, wherein said said security protocol tracks a transmission of a notification over said communication path.

49. The system of claim 48, wherein said notification is a short message sent from said initiating device to said receiving device.

50. The system of claim 49, wherein said distributed ledger is configured to store said encrypted copy of said message and wherein said identifier is a global unique identifier (GUID) pointing to said encrypted copy.

* * * * *